(12) United States Patent
Gusev et al.

(10) Patent No.: US 10,642,905 B2
(45) Date of Patent: May 5, 2020

(54) SYSTEM AND METHOD FOR RANKING SEARCH ENGINE RESULTS

(71) Applicant: YANDEX EUROPE AG, Lucerne (CH)

(72) Inventors: Gleb Gennadievich Gusev, Moscow (RU); Vadim Andreevich Nikulin, Moscow (RU); Yury Mikhailovich Ustinovskiy, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 352 days.

(21) Appl. No.: 15/368,925

(22) Filed: Dec. 5, 2016

(65) Prior Publication Data

US 2017/0185602 A1   Jun. 29, 2017

(30) Foreign Application Priority Data

Dec. 28, 2015  (RU) ................................. 2015156410

(51) Int. Cl.
 *G06F 16/951* (2019.01)
 *G06N 20/00* (2019.01)
(52) U.S. Cl.
 CPC .......... *G06F 16/951* (2019.01); *G06N 20/00* (2019.01)
(58) Field of Classification Search
 CPC ..................... G06F 17/30864; G06F 17/30867
 See application file for complete search history.

(56) References Cited

U.S. PATENT DOCUMENTS

| 7,092,901 B2 | 8/2006 | Davis et al. |
| 7,698,331 B2 | 4/2010 | Carson et al. |
| 8,108,374 B2 | 1/2012 | Zhang et al. |

(Continued)

FOREIGN PATENT DOCUMENTS

| EP | 2772571 A1 | 10/2012 |
| JP | 2011232996 A | 11/2011 |

(Continued)

OTHER PUBLICATIONS

English abstract of JP2011232996 retrieved from Espacenet on Mar. 17, 2017.

(Continued)

*Primary Examiner* — William Spieler
(74) *Attorney, Agent, or Firm* — BCF LLP

(57) ABSTRACT

There are discloses methods and systems for generating a search engine results page (SERP). The method is executable at a server executing a search engine, the server being accessible via a communication network by at least one electronic device. The method comprises, as part of generating a search result list, the search result list containing a first search result and a second search result, predicting a first interest parameter for the first search result; predicting a second interest parameter for the second search result; predicting a usefulness parameter for the first search result, the predicting being at least partially based on the first interest parameter and the second interest parameter; adjusting a position of the first search result within the ranked search result list based on the predicted usefulness parameter, the adjusting resulting in the first search result being at an adjusted position within the ranked search result list.

19 Claims, 8 Drawing Sheets

(56) References Cited

U.S. PATENT DOCUMENTS

| | | |
|---|---|---|
| 8,244,585 B1 | 8/2012 | Huang et al. |
| 8,370,337 B2 | 2/2013 | Kanungo et al. |
| 8,494,897 B1* | 7/2013 | Dawson ............... G06Q 30/02 705/14.42 |
| 8,650,173 B2 | 2/2014 | McDonald et al. |
| 8,706,725 B2 | 4/2014 | Bailey et al. |
| 8,732,177 B1 | 5/2014 | Chinnasamy et al. |
| 8,745,037 B2 | 6/2014 | Zhou et al. |
| 8,886,641 B2 | 11/2014 | Dong et al. |
| 8,924,314 B2 | 12/2014 | Kulkarni et al. |
| 2008/0016034 A1* | 1/2008 | Guha ............... G06F 17/30864 |
| 2008/0016046 A1* | 1/2008 | Guha ............... G06F 17/30864 |
| 2010/0082609 A1* | 4/2010 | Sun ................. G06F 17/30864 707/723 |
| 2010/0131563 A1 | 5/2010 | Yin |
| 2011/0264673 A1 | 10/2011 | White et al. |
| 2013/0246383 A1* | 9/2013 | White ............... G06F 16/9535 707/706 |
| 2014/0330819 A1* | 11/2014 | Raina ................ G06F 17/3053 707/723 |
| 2015/0161139 A1 | 6/2015 | Wang et al. |
| 2016/0055252 A1* | 2/2016 | Makeev ............ G06F 17/3053 707/733 |
| 2016/0210289 A1* | 7/2016 | Esinovskaya ..... G06F 17/30867 |
| 2016/0299899 A1* | 10/2016 | Logachev ......... G06F 17/30867 |
| 2016/0321694 A1* | 11/2016 | Vorozhtsov ............ G06Q 30/02 |
| 2016/0335314 A1* | 11/2016 | Grigoreva ......... G06F 17/30395 |
| 2016/0335358 A1* | 11/2016 | Grigoreva ............ G06F 17/3053 |
| 2016/0335359 A1* | 11/2016 | Grigoreva ......... G06F 17/30477 |
| 2016/0335365 A1* | 11/2016 | Grigoreva ......... G06F 17/30864 |
| 2016/0371389 A1* | 12/2016 | Segalovich ....... G06F 17/30864 |
| 2017/0098000 A1* | 4/2017 | Paris ................. G06F 17/30867 |
| 2017/0186035 A1* | 6/2017 | Levin ................. G06Q 30/0251 |

FOREIGN PATENT DOCUMENTS

| | | |
|---|---|---|
| RU | 2543315 C2 | 9/2014 |
| RU | 2549121 C2 | 4/2015 |

OTHER PUBLICATIONS

Russian search report from RU2015156410 dated Mar. 7, 2017.

Kou et al., "Learning to Blend Rankings: a Monotonic Transformation to Blend Rankings from Heterogeneous Domains", CIKM'10, Oct. 26-30, 2010, Toronto, Ontario, Canada. Copyright 2010 ACM 978-1-4503-0099-5/10/10...10.00.

Melucci, "Improving Ranking Using Quantum Probability", University of Padua, Aug. 2011, arXiv:1108.5491.

* cited by examiner

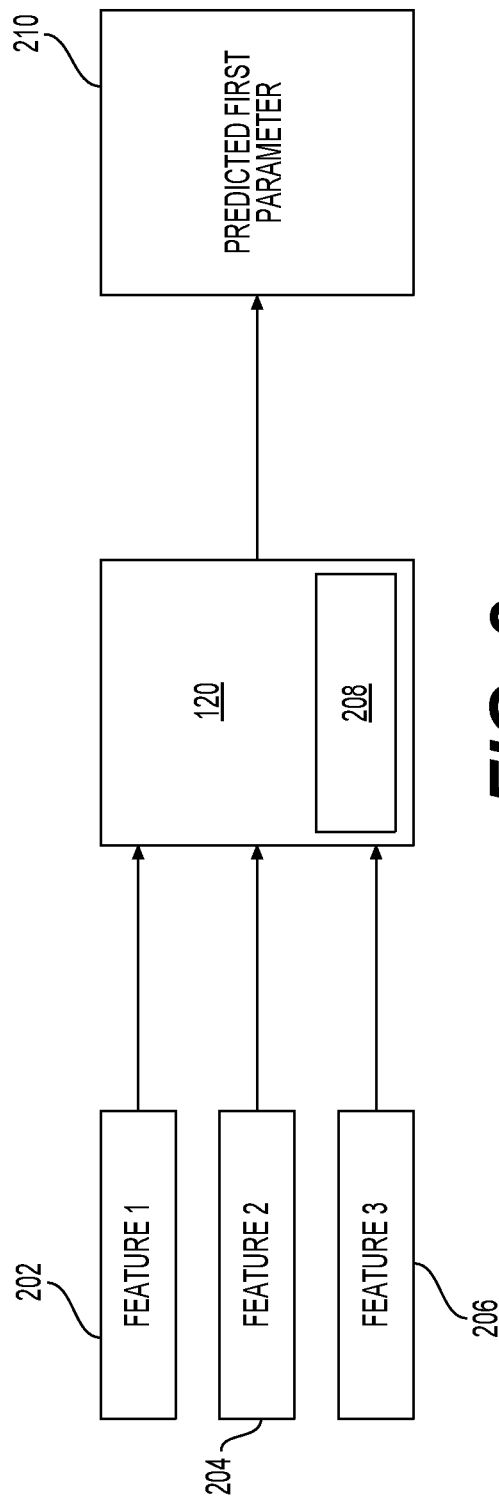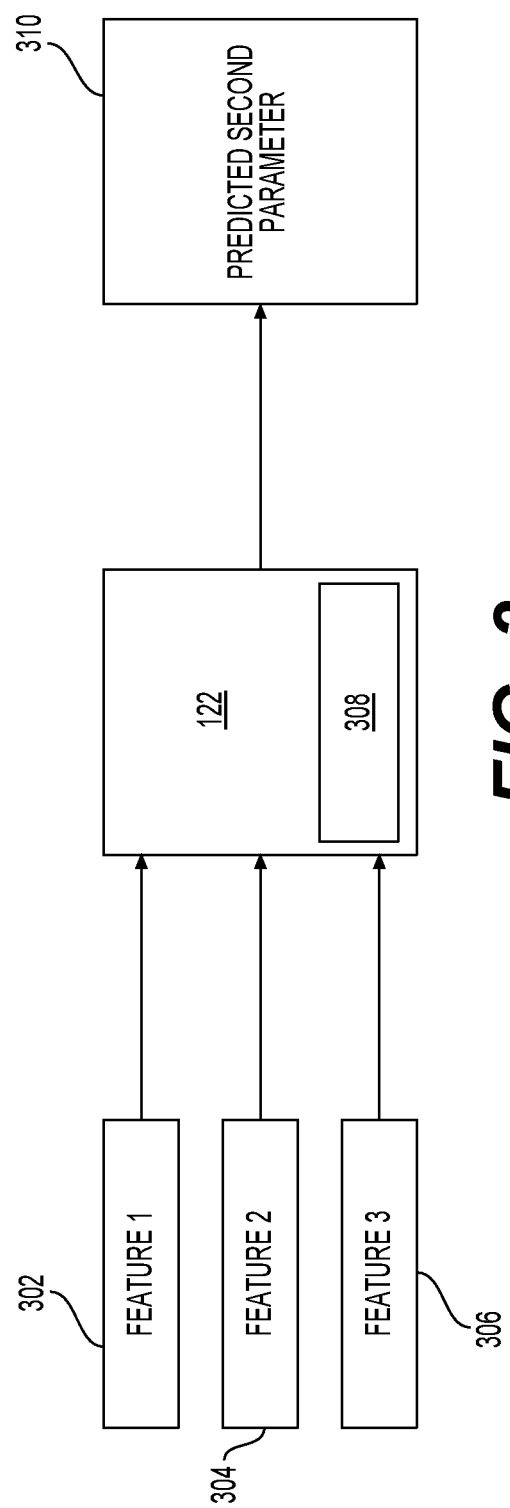

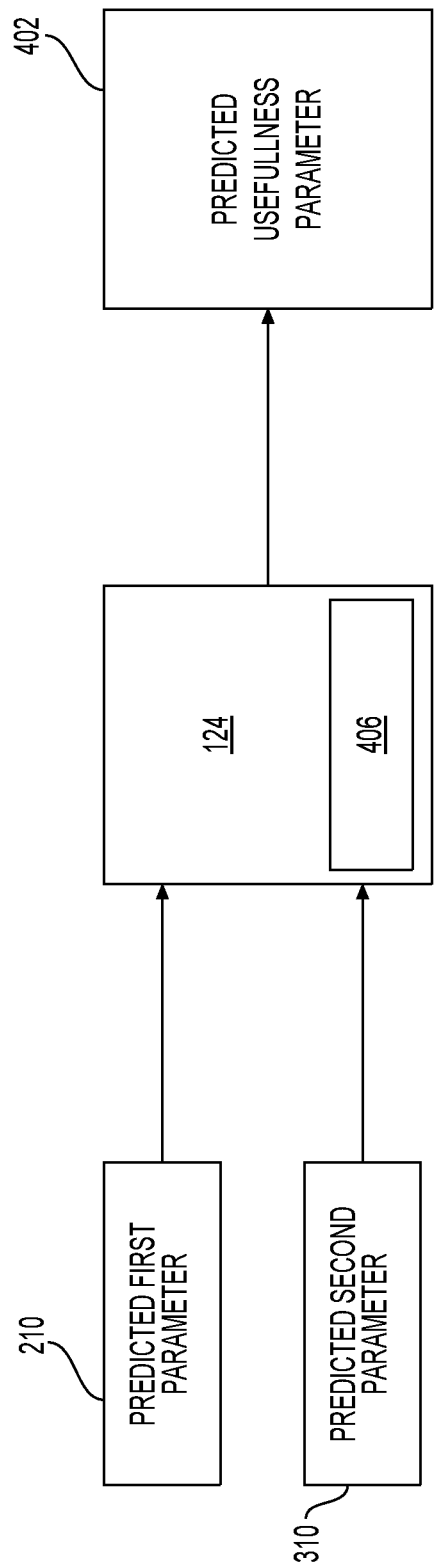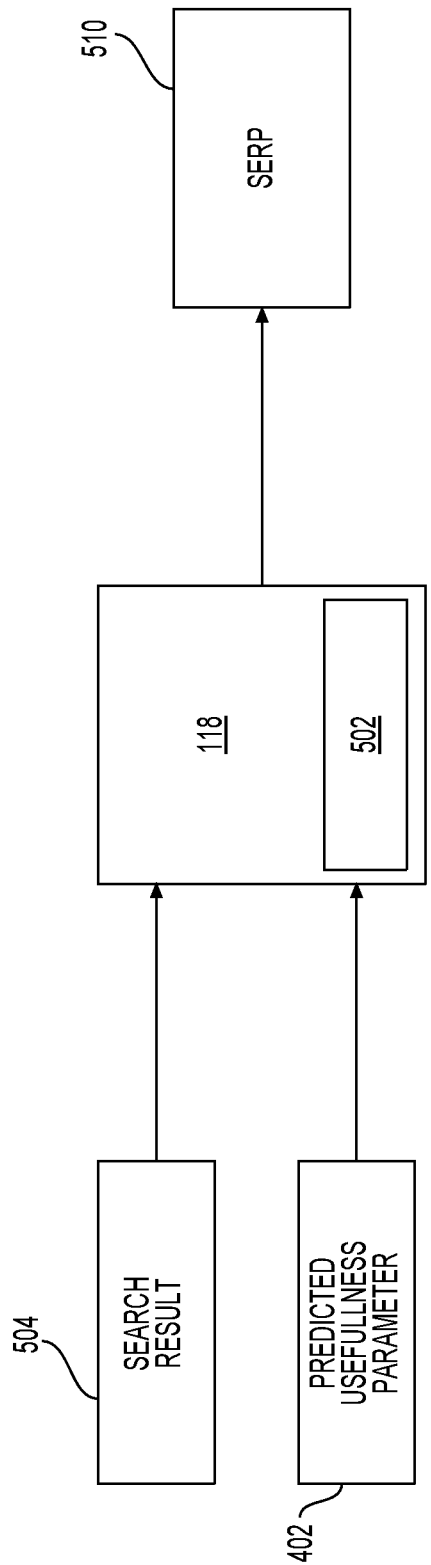

FIG. 9
*(PRIOR ART)*

SYSTEM AND METHOD FOR RANKING SEARCH ENGINE RESULTS

CROSS-REFERENCE

The present application claims priority to Russian Patent Application No. 2015156410, filed Dec. 28, 2015, entitled "A SYSTEM AND METHOD FOR RANKING SEARCH ENGINE RESULTS", the entirety of which is incorporated herein by reference.

FIELD

The present technology relates to search engines in general and specifically to a method and apparatus for ranking search results.

BACKGROUND

The Internet provides access to a wide variety of resources, for example, video files, image files, audio files, or Web pages, including content for particular subjects, reference articles, or news articles. A typical user can select a particular web resource she is wishing to access using a browser application executed on an electronic device, be it a desktop computer, a laptop computer, a tablet or a smartphone. There is a number of commercially available browsers to execute such a function, GOOGLE CHROME browser, INTERNET EXPLORE browser, YANDEX browser and the like. The user can type in a Universal Resource Locator (URL) of the web resource she is wishing to access or, alternatively, the user can select (click or otherwise actuate) a hyperlink to the URL of the web resource she is desirous of accessing.

The above approach works when the user is aware apriori of the web resource she is wishing to access. For example, if the user knows apriori that she wishes to access a web site of the Royal Bank of Canada, she can type into a browser of her choice, the URL associated with the Royal Bank of Canada, which can be www.rbc.com.

However, a given user may not know a specific web resource that the user wants to access, but rather know a type of information the user is looking for. In those circumstances, the user may use a so-called search engine to locate one or more web resources that provide information that the user is interested in. To that extent, the user can submit a "search query" and the search engine returns a ranked list of search results that are responsive to the search query in a form of a Search Engine Results Page (or SERP for short).

With reference to FIG. 9, there is provided a screen shot 9100 of a typical SERP provided by a prior art search engine, in this case, the search engine being implemented as YANDEX search engine, provided by Yandex LLC of 16, Leo Tolstoy St., Moscow 119021, Russia. For illustration purposes, the search engine that generated the screen shot 9100 is executed on a desktop computer.

Within the illustrated scenario, the user has typed into a search query interface 9102 of the search engine a search query "Ecuador", presumably interested in information about Ecuador. As will be appreciated, the search query "Ecuador" does not have a clear search intent, as the user typing in such the query may be interested in getting information about the country Ecuador, about the song "Ecuador" by Sash!, getting news about Ecuador or getting pictures of Ecuadorian landscapes.

The search query entered into the search query interface is transmitted to a search engine server (not depicted) and the search engine server executes a search and returns data for generating a SERP 9104. The SERP 9104 is configured to convey to the user one or more search results. These search results, as well as their presentation, will vary, but generally and as an example only will include: a first search result 9106, a second search result 9108, a third search result 9110 and a plurality of additional search results 9112. Some of these search results can be considered "web search results" and some of these search results can be considered to be "vertical search results". The web search results (such as the first search result 9106 and the third search result 9110, for example) are search results returned by a web search module of the search engine and are generally web resources available on the Internet (in these case, these are Russian article about Ecuador on WIKIPEDEA and Lonely Planet article about Ecuador, respectively). The vertical search results (such as the second search result 9108, for example) are search results returned by one or more of the vertical search modules of the search engine (in this case, the second search result 9108 is implemented as a "widget" presenting results of the video vertical—i.e. one or more videos that are responsive to the search query "Ecuador").

Optionally, the SERP 9104 may also include an object card 9114. The object card 9114 is typically presented when the search engine determines that the search query is associated with an "object", the object typically includes either a person (an actor, a singer, a politician or the like), a point of interest (such as a bridge, a museum, a city hall, a train station and the like) or any other entity (such as a movie, a play and the like).

The SERP 9104 may also include vertical domain actuator 9120, which is configured to allow the user to select (and change) a particular search domain—in the illustrated example, the user can cause the SERP 9104 to switch from the current "web" view of search results, to one or more vertical domains, including: "maps", "images", "news", "videos" and the like. The number and exact types of the vertical domains can differ, but vertical domains allow the user to switch to a particular type of search results. For example, if the user was interested in images of Ecuador, the user could switch to the "images" vertical, which would cause the SERP 9104 to change and to present to the user search results from the "images" vertical, the search result being images that are responsive the search query "Ecuador".

One will easily appreciate that the search results shown as part of the plurality of additional search results 9112 is not an entirety of all search results that the search engine has generated in response to the search query. On the contrary, the plurality of additional search results 9112 includes many more search results that are not visible within the screen shot 9100, due to the limitations of the real estate of a display of the electronic device. Furthermore, search engines typically "split" search results in several screens and to that end a scroll actuator 9116 is provided to switch to the "next" portion of the SERP 9104. The scroll actuator 9116 can be an arrow, a numeric indicator of screens within the SERP 9104 or the like.

One of the technical challenges for the search engine server, is to select and rank search results to generate the SERP 9104 that is "time effective" for the user. What this means is that search engines strive to put the most relevant search results (i.e. the search results that are more likely to satisfy the user's search intent" towards the "top" of the SERP 9104. In other words, the search results presented on higher positions of the SERP 9104 (i.e. first n-number of search results shown on the first page of the SERP 9104)

should be able to satisfy the user's search intent. There is a general belief in the industry that if the user has to "scroll" through the search results to the second, third, etc. pages of the SERP 9104, the "quality" of the SERP 9104 is deemed to be lower than desired.

Search engines employ various techniques and algorithms for ranking search results. Typically, a machine learning algorithm is used for ranking the search results into the SERP 9104. Various techniques are available for ranking search results. Just as an example, some of the known techniques for ranking search results by relevancy are based on some or all of: (i) how popular a given search query or a response thereto is in other prior searches (web or vertical); (ii) how many results have been returned by either the vertical or web search modules; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP 9104.

One of the parameters used by prior ranking algorithms, especially for ranking vertical search results relative to the web search results, is a so-called "usefulness parameter". A typical prior art system can rank search results based on a Click Through Rate (CTR) rate analysis of a first search result (a higher ranked search result, which is typically a vertical search result), typically referred to as a "win" and a second search result (following immediately after the first search result, which is typically but not necessarily a web search result), typically referred to as a "loss". The function that is typically used is "S(f, iw)–win–loss", where $f$ is ranking features, iw is a parameter that is indicative of the position of the given search result. The ranking features can include one or more of: word occurrence probability, behavioural patterns, personalized parameters respectively associated with the first search result and the second search result. The iw parameter can include the rank of the first search result and the second search result, its associated intent weight (i.e. a parameter indicative of potential user need in search results of a particular category—images, video, maps, news, etc).

Within the prior art solutions, a machine learning algorithm is trained to predict the usefulness parameter. The machine learning algorithm is trained using: (i) as input parameters, a rank of the search result and the associated ranking features, the associated ranking features having been determined based on an analysis of prior (i.e. historic) search sessions performed by other users; (ii) as labelled answers—the CTR value for the given SERP position.

As part of the machine learning algorithm training, the machine learning algorithm established a relationship between (i) the value of the usefulness parameter function "S(f, iw)–win–loss" on one hand and (ii) ranking features (including iw feature) on the other hand. The usefulness parameter formula is then used to select a particular position for a given vertical search result within the SERP, the particular position being selected such that to maximize the usefulness parameter for the given vertical search result.

U.S. Pat. No. 8,706,725 teaches methods for re-ranking documents based on user-specific features. Search results are received from a non-contextual ranking system such that the search results are not specific toward a particular user, such as the user who submitted the search query. Contextual signals are received and provide user-specific features that are used to re-rank documents so that the most important and relevant documents are listed at the top of the list of search results. Each of the user-specific features are evaluated and compared to determine a new position of each document. A set of contextual search results is then generated based on the new positions.

U.S. Pat. No. 8,650,173 discloses technologies for placing search results on a search engine results page (SERP). A query may be received. The query may be transmitted to a plurality of search result providers. A first set of search results and a second set of search results may be received from the search result providers. Intent features may be extracted from the first set of search results. User intent of the second set of search results may be inferred based on the extracted intent features. The first set of search results and the second set of search results may be ranked based on the inferred user intent. The SERP may be rendered according to the ranked first set and second set of search results.

U.S. Pat. No. 7,698,331 teaches a system for generating a search result list in response to a search request from a searcher using a computer network. A first database is maintained that includes a first plurality of search listings. A second database is maintained that includes documents having general web content. A search request is received from the searcher. A first set of search listings is identified from the first database having documents generating a match with the search request and a second set of search listings is identified from the second database having documents generating a match with the search request. A confidence score is determined for each listing from the first set of search listings wherein the confidence score is determined in accordance with a relevance of each listing when compared to the listings of the second set of search listings. The identified search listings from the first set of search listing are ordered in accordance, at least in part, with the confidence score for each search listing.

SUMMARY

It is an object of the present invention to ameliorate at least some of the inconveniences present in the prior art.

Embodiments of the present technology have been developed based on developers' appreciation of at least one technical problem associated with the prior art approaches to ranking of the vertical search results based on a usefulness parameter. Developers have realized that in certain circumstances a CTR of two neighboring search results can be very close therebetween and, as such, the difference in the CTR values may not be directly dependent on the relative rank. Developers have further appreciated that in these circumstances, the prior art approaches may be ineffective (or less effective) in determining, for a given vertical search result, a position of the SERP where the usefulness parameter for the given vertical search result is maximized. This, in turn, can lead to generation of the SERP that is not optimized for the user's search intent. That, in turn, may result in user's having to submit multiple search requests (with clarifying and/or narrowing and/or refocused search terms) in order to obtain the information the user was looking for in the first place. This can lead to several issues. First, it places a strain on the computing resources of the search engine for having to process multiple search requests. Secondly, it places a strain on connection bandwidth between the user electronic device and the server associated with the search engine. Last but not least, for those electronic devices that are powered by a battery, that places a unnecessary strain on the battery.

To illustrate the root of the problem identified by the developers, without wishing to be bound by any particular theory, reference will be made to FIG. 10, which depicts a graph 10200. The graph 10200 maps a particular value 9202 of CTR to a particular value 9204 of iw. Let it be assumed, that there is a determined relationship (based on analysis of historic search data) between CTR and the position of the given search result (i.e. the parameter iw). Therefore—two graphs can be plotted—a first search result graph, depicted in FIG. 10 as 10206 and a second search result graph, depicted in FIG. 10 as 10208. The first search result graph 10206 and the second search result graph 10208 are, associated, respectively with the first search result and the second search result mentioned herein above. Thus—it can be said that the first result is the search result being "optimized" (i.e. the first result is a vertical search result for which a SERP position is being optimized) and the second result is a search result following immediately thereafter.

Within the depicted illustration, a usefulness parameter graph 10210 (calculated using the prior art formula mentioned above) has an unclear maximum around search results positions 4-8. In certain other circumstances the usefulness parameter can be calculated using a different algorithm (based on a number of components in addition to CTR), such as $S(iw, f) = \Sigma_i k_i T_i$, and under those circumstances, the correlation can exist not only between CTRs, but also amongst other parameters, hence, making the maximum even more "watered down". This can lead to the determination of the position on the SERP having the highest usefulness more challenging.

Embodiments of the present technology, broadly speaking, address the above technical problems by use of a dedicated (or, in other words, an independent) machine learning algorithm for generating (i.e. predicting) each of the components (i.e. the win component and the loss component) which are then used in the function of generating the usefulness parameter. In accordance with various embodiments of the present technology, a first machine learning algorithm is trained for predicting a first component that is used for calculating the usefulness parameter, the first machine learning algorithm using a first set of training factors, the first set of training factors including at least one factor $f$ that is used for training the usefulness function. Similarly, a second machine learning algorithm is trained for predicting a second component that is used for calculating the usefulness parameter, the second machine learning algorithm using a second set of training factors, the second set of training factors including at least another factor $f$ that is used for training the usefulness function.

As a result of the respective training of the first machine learning algorithm and the second machine learning algorithm, a set of values for the given component (i. either the win or the loss components) are generated. Each value corresponds to a factor from a set of factors (such as, for example $p(f,iw)$). The so-determined values of components are used (optionally together with the factors $f$ as parameters for training the usefulness function). As a result, the so trained usefulness function allows predicting of values of the usefulness parameter based on the values of win and loss components.

Embodiments of the present technology allow, when the so generated usefulness parameter is used, to calculate the usefulness parameter based on the independently predicted win and loss components.

For example, the win component (which is representative of a clickability of a given search result at a given SERP position) allows predicting how useful (i.e. interesting) the given search result associated with the given SERP position is likely to be. The higher the win value is indicative of a search result with a relatively higher potential interest (as such, its associated usefulness parameter should be increased). Lower win value is indicative of a relatively lower potential interest (as such, the value of the function $S(f, iw)$ should be decreased. Using the usefulness parameter formula, the "most suitable" position on the SERP can be determined—this can involve selecting such the value iw, which maximizes the usefulness parameter value. The so determined iw value (i.e. the position on the SERP) is used for placing the given search result.

According to a first broad aspect of the present technology, there is provided a method of generating a search engine results page (SERP). The method is executable at a server executing a search engine, the server being accessible via a communication network by at least one electronic device. The method comprises: receiving, from the at least one electronic device, a search query; generating a search result list, the search result list containing a first search result and a second search result, both of which are responsive to the search query, ranking the search result list such that as a result of the ranking, the first search result and the second search result are at a first SERP position and a second SERP position, respectively, the first SERP position and the second SERP position being adjacent therebetween; the ranking resulting in a ranked search result list; predicting a first interest parameter for the first search result, the predicting based on a first machine learning algorithm; predicting a second interest parameter for the second search result, the predicting based on a second machine learning algorithm, the second machine learning algorithm being different with the first machine learning algorithm; predicting a usefulness parameter for the first search result, the predicting being based on a third machine learning algorithm, the predicting being at least partially based on the first interest parameter and the second interest parameter; adjusting the position of the first search result within the ranked search result list based on the predicted usefulness parameter, the adjusting resulting in the first search result being at an adjusted position within the ranked search result list; generating the SERP including the first search result and the second search result, the first search result being positioned at the adjusted position of the SERP.

In some embodiments of the method, the first search result is a vertical search result.

In some embodiments of the method, the second search result is a web search result.

In some embodiments of the method, the first machine learning algorithm and the second machine learning algorithm have been trained independently therebetween.

In some embodiments of the method, the third machine learning algorithm has been trained using parameters predicted by the first machine learning algorithm and the second machine learning algorithm.

In some embodiments of the method, parameters predicted by the first machine learning algorithm and the second machine learning algorithm include a first factor indicative of a click-through rate of a given search result and a second factor indicative of a click-through rate of another search result following, in a ranked order, the given search result.

In some embodiments of the method, the third machine algorithm is based at least in part on a modified "win-loss" algorithm In some embodiments of the method, the adjusting the position of the first search result further comprises an additional adjusting the position of the second search result in line with the adjusted position of the first search result.

In some embodiments of the method, the search result list further comprises a third search result ranked at a third SERP position, the third SERP position being adjacent to the second SERP position, the method further comprises: predicting a third interest parameter for the first search result for the second SERP position, the predicting based on the first machine learning algorithm; predicting a fourth interest parameter for the third search result, the predicting based on the second machine learning algorithm; and wherein the predicting the usefulness parameter for the first search result, further comprises predicting a second usefulness parameter for the first search result, the predicting being based on the third machine learning algorithm, the predicting being at least partially based on the third interest parameter and the fourth interest parameter; and wherein the adjusting the position of the first search result further comprises selecting one of the first SERP position and the second SERP position for placing the first search result based on comparison of the usefulness parameter and the second usefulness parameter.

In some embodiments of the method, the predicting usefulness parameter and the predicting the second usefulness parameter are executed substantially simultaneously.

In some embodiments of the method, each of the first interest parameter and the second interest parameter is a respective predicted click-through rate.

In accordance with another broad aspect of the present technology, there is provided a method of generating a search engine results page (SERP). The method is executable at a server executing a search engine, the server being accessible via a communication network by at least one electronic device, the method comprising: receiving, from the at least one electronic device, a search query; generating a search result list, the search result list containing a first search result, a second search result and a third search result, the first search result being a vertical search result and the second search result and the third search result being web search results, all of the first, second and third search results being responsive to the search query; ranking the second search result and the third search result in a ranked order such that the second search result is at a first ranked position and the third search result is in a second ranked position; the first ranked position and the second ranked position being adjacent therebetween; for each of the first ranked position and the second ranked position, determining a respective usefulness parameter for the first search result, the determining being executed by: predicting a first interest parameter for the first search result at a respective one of each of the first ranked position and the second ranked position, the predicting based on a first machine learning algorithm; predicting a second interest parameter for a following search result, the predicting based on a second machine learning algorithm, the second machine learning algorithm being different from the first machine learning algorithm; the following search result being a respective one of the second search result and the third search result; predicting the respective usefulness parameter for the first search result, the predicting being based on a third machine learning algorithm, the predicting being at least partially based on the first interest parameter and the second interest parameter; selecting a given one of the first ranked position and the second ranked position for placing the first search result, the given one of the first ranked position and the second ranked position being associated with a highest value of the usefulness parameter; generating the SERP including the first search result being placed at the given one of the first ranked position and the second ranked position.

In some embodiments of the method, the first machine learning algorithm and the second machine learning algorithm have been trained independently therebetween.

In some embodiments of the method, the third machine learning algorithm has been trained using parameters predicted by the first machine learning algorithm and the second machine learning algorithm.

In some embodiments of the method, parameters predicted by the first machine learning algorithm and the second machine learning algorithm include a first factor indicative of a click-through rate of a given search result and a second factor indicative of a click-through rate of another search result following, in a ranked order, the given search result.

In some embodiments of the method, the third machine algorithm is based at least in part on a modified "win-loss" algorithm.

In some embodiments of the method, the search result list further comprises a fourth search result, the fourth search result being another vertical search result, and wherein the method further comprises: for each of the first ranked position and the second ranked position, determining a respective second usefulness parameter for the fourth search result, the determining being executed: predicting a first interest parameter for the fourth search result at a respective one of each of the first ranked position and the second ranked position, the predicting based on the first machine learning algorithm; predicting a second interest parameter for a following search result, the predicting based on the second machine learning algorithm, the second machine learning algorithm being different from the first machine learning algorithm; the following search result being a respective one of the second search result and the third search result; predicting the respective second usefulness parameter for the fourth search result, the predicting being based on the third machine learning algorithm, the predicting being at least partially based on the first interest parameter and the second interest parameter; and wherein the selecting the given one of the first ranked position and the second ranked position comprises: selecting the given one of the first ranked position and the second ranked position for placing the first search result, the given one of the first ranked position and the second ranked position being associated with a highest value of the usefulness parameter; selecting the other one of the first ranked position and the second ranked position for placing the fourth search result, the other one of the first ranked position and the second ranked position being associated with a highest value of the second usefulness parameter; and wherein the generating the SERP comprises: placing the first search result at the given one of the first ranked position and the second ranked position; placing the fourth search result at the other one of the first ranked position and the second ranked position.

In accordance with another broad aspect of the present technology, there is provided a server comprising: an information storage medium; a network interface configured for communication over a communication network; a processor operationally coupled to the information storage medium and the network interface, the processor being configured to: receive, from the at least one electronic device, a search query; generate a search result list, the search result list containing a first search result and a second search result, both of which are responsive to the search query, rank the search result list such that as a result of the ranking, the first search result and the second search result are at a first SERP position and a second SERP position, respectively, the first SERP position and the second SERP position being adjacent therebetween; the ranking resulting in a ranked search result list; predict a first interest parameter for the first search result, the predicting based on a first machine learning algorithm; predict a second interest parameter for the second search result, the predicting based on a second machine learning algorithm, the second machine learning algorithm being different with the first machine learning algorithm; predict a usefulness parameter for the first search result, the predicting being based on a third machine learning algorithm, the predicting being at least partially based on the first interest parameter and the second interest parameter; adjust the position of the first search result within the ranked search result list based on the predicted usefulness parameter, the adjusting resulting in the first search result being at an adjusted position within the ranked search result list; generate SERP including the first search result and the second search result, the first search result being positioned at the adjusted position of the SERP.

In some embodiments of the sever, the first search result is a vertical search result.

In some embodiments of the sever, the second search result is a web search result.

In some embodiments of the sever, the first machine learning algorithm and the second machine learning algorithm have been trained independently therebetween.

In some embodiments of the sever, the third machine learning algorithm has been trained using parameters predicted by the first machine learning algorithm and the second machine learning algorithm.

In some embodiments of the sever, parameters predicted by the first machine learning algorithm and the second machine learning algorithm include a first factor indicative of a click-through rate of a given search result and a second factor indicative of a click-through rate of another search result following, in a ranked order, the given search result.

In some embodiments of the sever, the third machine algorithm is based at least in part on a modified "win-loss" algorithm In some embodiments of the sever, to adjust the position of the first search result, the processor is configured to additionally adjust the position of the second search result in line with the adjusted position of the first search result.

In some embodiments of the sever, the search result list further comprises a third search result ranked at a third SERP position, the third SERP position being adjacent to the second SERP position, the processor being further configured to: predict a third interest parameter for the first search result for the second SERP position, the predicting based on the first machine learning algorithm; predict a fourth interest parameter for the third search result, the predicting based on the second machine learning algorithm; and wherein to predict the usefulness parameter for the first search result, the processor is further configured to predict a second usefulness parameter for the first search result, the predicting being based on the third machine learning algorithm, the predicting being at least partially based on the third interest parameter and the fourth interest parameter; and wherein to adjust the position of the first search result, the processor is further configured to select one of the first SERP position and the second SERP position for placing the first search result based on comparison of the usefulness parameter and the second usefulness parameter.

In some embodiments of the sever, the processor is configured to execute the predicting usefulness parameter and the predicting the second usefulness parameter substantially simultaneously.

In some embodiments of the sever, each of the first interest parameter and the second interest parameter is a respective predicted click-through rate.

In according with yet another broad aspect of the present technology, there is provided a server comprising: an information storage medium; a network interface configured for communication over a communication network; a processor operationally coupled to the information storage medium and the network interface, the processor being configured to: receive, from the at least one electronic device, a search query; generate a search result list, the search result list containing a first search result, a second search result and a third search result, the first search result being a vertical search result and the second search result and the third search result being web search results, all of the first, second and third search results being responsive to the search query; rank the second search result and the third search result in a ranked order such that the second search result is at a first ranked position and the third search result is in a second ranked position; the first ranked position and the second ranked position being adjacent therebetween; for each of the first ranked position and the second ranked position, determining a respective usefulness parameter for the first search result, the determining being executed by: predicting a first interest parameter for the first search result at a respective one of each of the first ranked position and the second ranked position, the predicting based on a first machine learning algorithm; predicting a second interest parameter for a following search result, the predicting based on a second machine learning algorithm, the second machine learning algorithm being different from the first machine learning algorithm; the following search result being a respective one of the second search result and the third search result; predicting the respective usefulness parameter for the first search result, the predicting being based on a third machine learning algorithm, the predicting being at least partially based on the first interest parameter and the second interest parameter; select a given one of the first ranked position and the second ranked position for placing the first search result, the given one of the first ranked position and the second ranked position being associated with a highest value of the usefulness parameter; generate SERP including the first search result being placed at the given one of the first ranked position and the second ranked position.

In some embodiments of the sever, the first machine learning algorithm and the second machine learning algorithm have been trained independently therebetween.

In some embodiments of the sever, the third machine learning algorithm has been trained using parameters predicted by the first machine learning algorithm and the second machine learning algorithm.

In some embodiments of the sever, parameters predicted by the first machine learning algorithm and the second machine learning algorithm include a first factor indicative of a click-through rate of a given search result and a second factor indicative of a click-through rate of another search result following, in a ranked order, the given search result.

In some embodiments of the sever, the third machine algorithm is based at least in part on a modified "win-loss" algorithm.

In some embodiments of the sever, the search result list further comprises a fourth search result, the fourth search result being another vertical search result, and wherein the processor is further configured to: for each of the first ranked position and the second ranked position, determine a respective second usefulness parameter for the fourth search result, the determining being executed by: predicting a first interest parameter for the fourth search result at a respective one of each of the first ranked position and the second ranked position, the predicting based on the first machine learning algorithm; predicting a second interest parameter for a following search result, the predicting based on the second machine learning algorithm, the second machine learning algorithm being different from the first machine learning algorithm; the following search result being a respective one of the second search result and the third search result; predicting the respective second usefulness parameter for the fourth search result, the predicting being based on the third machine learning algorithm, the predicting being at least partially based on the first interest parameter and the second interest parameter; and wherein to select the given one of the first ranked position and the second ranked position, the processor is configured to: select the given one of the first ranked position and the second ranked position for placing the first search result, the given one of the first ranked position and the second ranked position being associated with a highest value of the usefulness parameter; select the other one of the first ranked position and the second ranked position for placing the fourth search result, the other one of the first ranked position and the second ranked position being associated with a highest value of the second usefulness parameter; and wherein the to generate SERP, the processor is configured to: place the first search result at the given one of the first ranked position and the second ranked position; place the fourth search result at the other one of the first ranked position and the second ranked position.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests, retrieval of historical search sessions) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "a server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, and as was discussed hereinabove, a "posting list" for a given search term is typically a list of references to the data items in the data collection that include that search term. As such, one will understand that the more common the search term, the greater the number of references there will be in the posting list. For a ubiquitous search term, e.g., the English word "the", the posting list will include a reference to every data item in the data collection. For almost all other search terms this is not the case, however, and there will be gaps between data items in the data collection containing that search term formed by those data items that do not. Thus, for example, assuming the references in the posting list were to document numbers, there will be corresponding gaps in the document numbers in the posting list.

A posting list for a given common search term (i.e., a search term found in relatively many, but not all, of the documents) will contain references, in the form of the document numbers, to those documents in which the search term occurs. The references in the posting list are themselves in numerical order, although there will be gaps between the document numbers as the search term does not occur in documents having the skipped document numbers that form the gaps. The length of a posting list will vary, depending on the number of data items in the data collection that include the search term. As such, the length of a posting list may even be zero, which would be the case if no documents within the data collection contain occurrences of the search term in question.

In the context of the present specification, and as was discussed hereinabove, an "inverted index" comprises a number of posting lists.

In some embodiments, each of the plurality of posting lists corresponding to the plurality of search terms references a plurality of indexed items, the indexed items being sequentially numbered. As was discussed above, this is typically the case when dealing with Internet search engines, where the indexed items are sequentially numbered with document numbers.

In some embodiments, each of the plurality of posting lists corresponding to the plurality of search terms references a plurality of indexed items, the indexed items being ordered in an order of decreasing query-independent relevance. This is typically the case in respect of Internet search engines, in which the index items are not randomly inserted into the data collection. Typically, the items in the data collection are ordered within the data collection in an order of decreasing query-independent relevance. In this manner, the data items that are statistically more likely to be part the search results of any given search query will be arranged so as to be searched towards the beginning of the search. They are thus likely to be located more quickly than if the data in the data collection had been randomly entered.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 2 is a schematic representation of operation of a first module of the system of FIG. 1, the first module executing a first machine learning algorithm.

FIG. 3 is a schematic representation of operation of a second module of the system of FIG. 1, the second module executing a second machine learning algorithm.

FIG. 4 is a schematic representation of operation of a third module of the system of FIG. 1, the third module executing a third machine learning algorithm.

FIG. 5 is a schematic representation of operation of a search module of the system of FIG. 1, the search module being configured to rank search results based at least in part on an output of the third module of FIG. 4.

Figure 9:
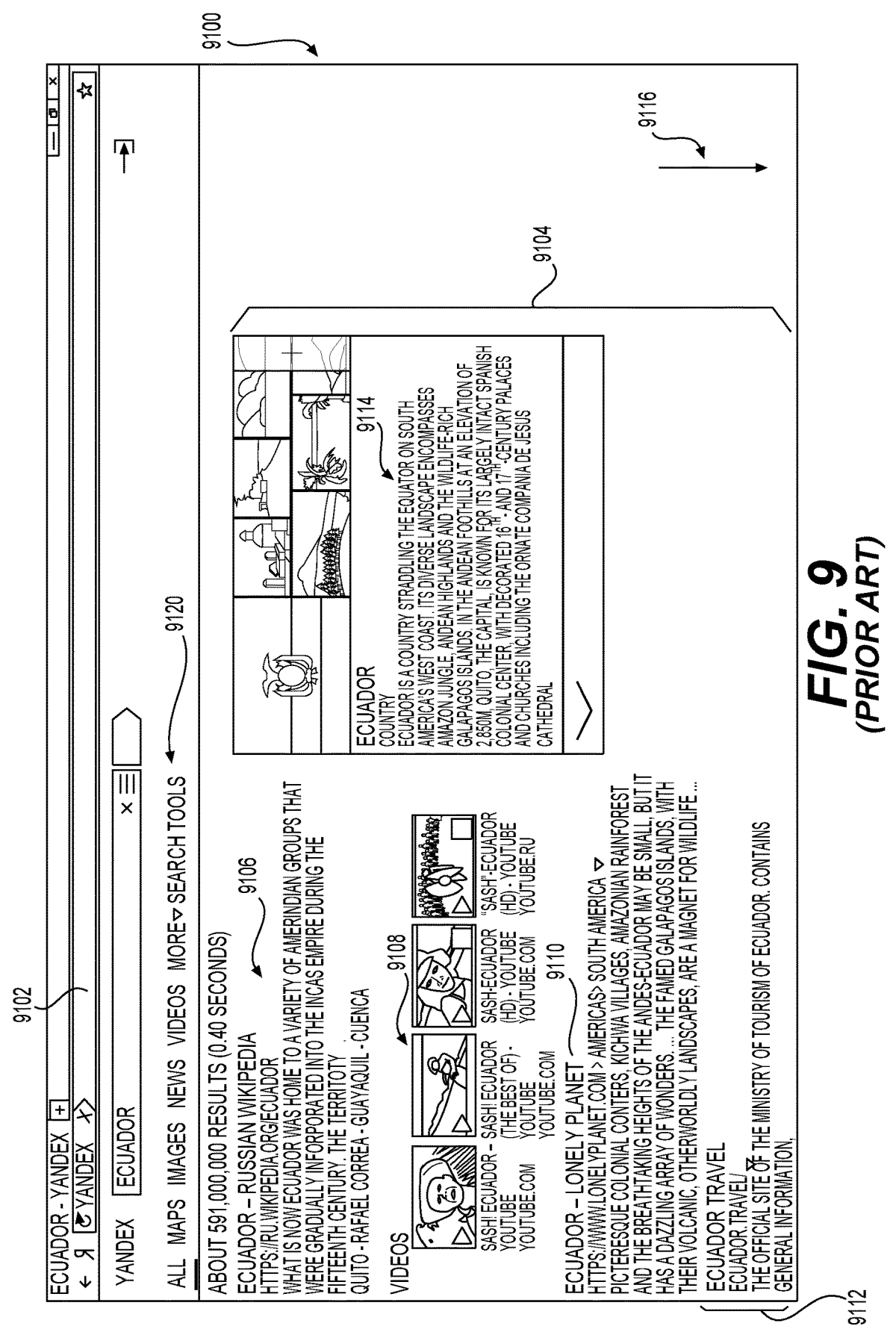

FIG. 9 depicts a screen shot of a typical SERP provided by a prior art search engine.

DETAILED DESCRIPTION

Figure 1:
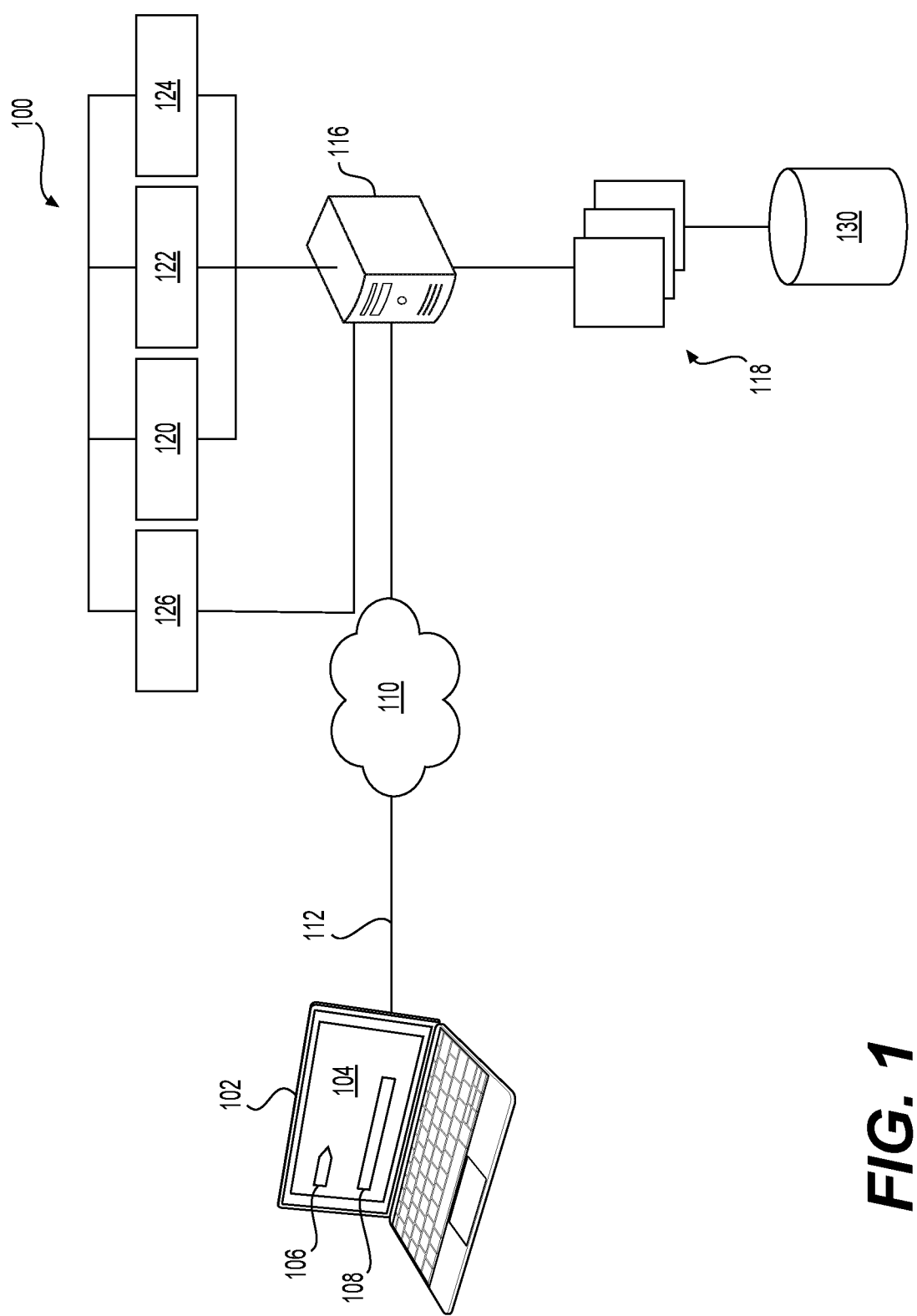
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth herein below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to receive search queries and to conduct searches (e.g., general searches, vertical searches) in response thereto, as well as to generate annotated search indexes in accordance with non-limiting embodiments of the present technology. As such, any system variation configured to process user search queries and generate annotated search indexes can be adapted to execute embodiments of the present technology, once teachings presented herein are appreciated.

The system 100 comprises an electronic device 102. The electronic device 102 is typically associated with a user (not depicted) and, as such, can sometimes be referred to as a "client device" or a "client electronic device". It should be noted that the fact that the electronic device 102 is associated with the user does not need to suggest or imply any mode of operation—such as a need to log in, a need to be registered, or the like.

The implementation of the electronic device 102 is not particularly limited, but as an example, the electronic device 102 may be implemented as a personal computer (desktops, laptops, netbooks, etc.), a wireless communication device (such as a smartphone, a cell phone, a tablet and the like), as well as network equipment (such as routers, switches, and gateways). The electronic device 102 comprises hardware and/or software and/or firmware (or a combination thereof), as is known in the art, to execute a search application 104. Generally speaking, the purpose of the search application 104 is to enable the user (not depicted) to execute a search, such as a web search using a search engine.

How the search application 104 is implemented is not particularly limited. One example of the search application 104 may include a user accessing a web site associated with a search engine to access the search application 104. For example, the search application can be accessed by typing in an URL associated with Yandex™ search engine at www.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited to) those implementations, where the electronic device 102 is implemented as a portable device, such as for example, Samsung™ Galaxy™ SIII, the electronic device 102 may be executing a Yandex browser application. It should be expressly understood that any other commercially available or proprietary browser application can be used for implementing non-limiting embodiments of the present technology.

Generally speaking, the search application 104 comprises a search query interface 106 and a search result interface 108. The general purpose of the search query interface 106 is to enable the user (not depicted) to enter his or her query or a "search string". The general purpose of the search result interface 108 is to provide search results that are responsive to the user search query entered into the search query interface 106.

Also coupled to the communication network is a server 116. The server is accessible by the electronic device 102 via a communication network 110 (the electronic device 102 being just one example of a plethora of other electronic devices, which are not depicted, but which can access the server 116 via the communication network 110.

The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware. In the depicted non-limiting embodiments of the present technology, the server 116 is a single server. In alternative non-limiting embodiments of the present technology, the functionality of the server 116 may be distributed and may be implemented via multiple servers.

The electronic device 102 is configured to communicate with the server 116 via the communication network 110 and a communication link 112. In some non-limiting embodiments of the present technology, the communication network 110 can be implemented as the Internet. In other embodiments of the present technology, the communication network 110 can be implemented differently, such as any wide-area communication network, local-area communication network, a private communication network and the like.

How the communication link 112 is implemented is not particularly limited and will depend on how the electronic device 102 is implemented. Merely as an example and not as a limitation, in those embodiments of the present technology where the electronic device 102 is implemented as a wireless communication device (such as a smartphone), the communication link 112 can be implemented as a wireless communication link (such as but not limited to, a 3G communication network link, a 4G communication network link, Wireless Fidelity, or WiFi® for short, Bluetooth® and the like). In those examples where the electronic device 102 is implemented as a notebook computer, the communication link can be either wireless (such as Wireless Fidelity, or WiFi® for short, Bluetooth® or the like) or wired (such as an Ethernet based connection).

The server 116 is communicatively coupled (or otherwise has access) to a search module 118. According to these embodiments of the present technology, the search module 118 performs general and/or vertical searches in response to the user search queries inputted via the search query interface 106 and outputs search results to be presented to the user using the search result interface 108.

Within these non-limiting embodiments of the present technology, the search module 118 comprises or otherwise has access to a database 130. As is known to those of skill in the art, the database 130 stores information associated with a plurality of resources potentially accessible via the communication network (for example, those resources available on the Internet).

The process of populating and maintaining the database 130 is generally known as "crawling". The implementation of the database 130 is not particularly limited. It should be understood that any suitable hardware for storing data may be used. In some implementations, the database 130 may be physically contiguous with the search module 118, i.e., they are not necessarily separate pieces of hardware, as depicted, although they may be. In the depicted non-limiting embodiments of the present technology, the database 130 is a single database. In alternative non-limiting embodiments of the present technology, the database 130 may be segregated into one or more separate databases (not depicted). These segregated databases may be portions of the same physical database or may be implemented as separate physical entities. For example, one database within, let's say, the database 130 could host the inverted index, while another database within the database 130 could host the resources available, while yet another database within the database 130 could host the features of the search histories pertaining to particular search queries (i.e., the historical search sessions). Needless to say, the above has been provided as an illustration only and several additional possibilities exist for implementing embodiments of the present technology.

The database 130 also stores information and data repressing past search queries, such as: what the users searched for, which search results where presented, which positions a given search result were presented on, which results where selected, whether a given search result was selected, how much time a given user spent on a given past result, how many reformulations a given user submitted and the like. In alternative embodiments, information representative of the past search queries can be stored in a separate database from the database 130.

It should be expressly understood that in order to simplify the description presented herein below, the configuration of the search module 118 and the database 130 has been greatly simplified. It is believed that those skilled in the art will be able to appreciate implementational details for the search module 118 and for components thereof and for the database 130.

In general, a given search query that a given user may type in using the search query interface 106 may be considered to be a series of one or more search terms, and the search terms thereof may be represented as $T_1, T_2, \ldots T_n$. Thus, the search query may be understood as a request to the search application 104 to locate every document within the data collection an index of which is maintained by the database 130 containing each and every one of the search terms $T_1$, $T_2, \ldots T_n$ (the logical equivalent of an "AND" between the search terms; i.e., every document resulting from the search must contain at least one occurrence of the word $T_i$, for every i from 1 to n). Alternatively, the search query may be understood as a request to the search application 104 to locate every document within the data collection an index of which is maintained by the database 130 containing at least the search terms $T_1, T_2, \ldots T_n$, as well as other terms.

Within these embodiments of the present technology, the server 116 is configured to access the search module 118 (to perform a general web search and/or a vertical search, for example, in response to the submitted search query). Within the embodiment depicted in FIG. 1, the server 116 is generally configured to (i) receive, from the electronic device 102, a search query (such as the search query entered through the search query interface 106;

(ii) conduct searches (by accessing the search module 118) to generate a search result list, the search result list containing a first search result and a second search result, both of which are responsive to the search query—within some embodiments of the present technology, the first search result being a vertical search result and the second search result being a web search result);

(iii) execute analysis of search results and perform ranking of search results to generate a ranked search results list (the process of generating the ranked search result list will be described in greater detail herein below);

(iv) group search results to generate the search results page (SERP) to be outputted to the electronic device 102 in response to the search query.

More specifically, the server 116 is coupled (or otherwise has access to) a first module 120, a second module 122, a third module 124 and a training module 126 (which training module 126, in turn, is coupled to each one of the first module 120, the second module 122 and the third module 124.

Each of the first module 120, the second module 122 and the third module 124 is configured to execute its respective machine learning algorithm. The specific implementation of the respective machine learning algorithm is not particularly limited and can include, broadly speaking, a supervised learning algorithm or a supervised machine learning algorithm. Examples of the supervised learning algorithms include (but are not limited to): Artificial neural network; Bayesian statistics; Case-based reasoning; Gaussian process regression; Gene expression programming; Group method of data handling (GMDH); Inductive logic programming; Instance-based learning; Lazy learning; Learning Automata; Learning Vector Quantization; Logistic Model Tree and the like.

Operation of the first module 120, the second module 122, the third module 124, as well as the training module 126 will now be described in greater detail.

With reference to FIG. 2, there is depicted a schematic representation of operation of the first module 120. The first module 120 is configured to execute a first machine learning algorithm 208. The first machine learning algorithm 208 is configured to predict a predicted first parameter 210. In some embodiments of the present technology, the predicted first parameter 210 is a win parameter, i.e. a parameter indicative of a likelihood of a click for a given search result (in some embodiments, the given search result being a vertical search result), the given search result placed at a particular position of the SERP. In other words, the predicted first parameter 210 is indicative of potential interest of the user in the given search result relative to the user search query (the premise being that the more likely the user is interested in the given search result, the more likely the user to click the given search result).

More specifically the first machine learning algorithm 208 is configured to predict the predicted first parameter 210 based on a plurality of features, including as examples: a first feature 202, a second feature 204 and a third feature 206. In accordance with embodiments of the present technology, the first feature 202 is a SERP position being used for prediction (i.e. at which position the first search result is placed within the SERP). The nature of the second feature 204 and the third feature 206 (as well as a number of additional features used by the first machine learning algorithm 208) is not particularly limited. Generally speaking, the second feature 204 and the third feature 206 can include some or all of: a number of search result within a certain vertical search results (for example, where the certain vertical search result is an images vertical search result represented by an images widget—how many images the images widget contain), the quality of individuals results within the certain vertical search result (for example, where the certain vertical search result is the images vertical search result represented by the images widget—the quality of images in the images widget), a pre-determined likelihood of the user clicking the widget based on one or more search terms contained in the search request, prior user interactions with the given search result, data representative of the features of the given search result and the like.

During the training phase of the first machine learning algorithm 208, the first machine learning algorithm 208 is provided with a set of training objects, for each training object there is provided: a respective set of the first feature 202, the second feature 204 and the third feature 206 (as well as potentially a number of additional features associated with the given training object) and a corresponding "target". Within the embodiments of the present technology, the target can be an actual past click-through data of the given training object (such as "1" for click and "0" for no click). Within the embodiments of the present technology, the given training object can be a prior vertical search result, the first feature 202 can be a position of the prior vertical search result within a given prior SERP, the second feature 204 and the third feature 206 can be retrieved from the database 130.

The number of the training objects used for training the first machine learning algorithm 208 is not particularly limited and can be selected by those of ordinary skill in the art, having access to the teachings of instant technology. Based on the training objects, the first machine learning algorithm 208 generates a machine learning algorithm formula for predicting the predicted first parameter 210 for a new first search result (i.e. a new vertical search result) for a given new position within a new SERP.

With reference to FIG. 3, there is depicted a schematic representation of operation of the second module 122. The second module 122 is configured to execute a second machine learning algorithm 308. The second machine learning algorithm 308 is configured to predict a predicted second parameter 310. In some embodiments of the present technology, the predicted second parameter 310 is a loss parameter, i.e. a parameter indicative of a likelihood of a click for a following search result following immediately after the given search result mentioned above (in some embodiments, the following search result being a web search result, but it should be understood that the following search result can be another vertical search result). Within embodiments of the present technology, the "following immediately" (or adjacent) means that the following search result is the one ranked immediately below the given search result mentioned above. However, it should be noted that in alternative embodiments, the following immediately or adjacent can mean separated by an intermediate one or more search results.

In other words, the predicted second parameter 310 is indicative of potential interest of the user in the following search result relative to the user search query (the premise being that the more likely the user is interested in the given search result, the more likely the user to click the given search result). Thus, the predicted second parameter 310 in a sense is indicative of the user clicking the following search result (instead of the given search result).

More specifically the second machine learning algorithm 308 is configured to predict the predicted second parameter 310 based on a plurality of features, including as examples: a first feature 302, a second feature 304 and a third feature 306. In accordance with embodiments of the present technology, the first feature 302 is a SERP position being used for prediction (i.e. at which position the following search result is placed within the SERP).

The nature of the second feature 304 and the third feature 306 (as well as a number of additional features used by the second machine learning algorithm 308) is not particularly limited. Generally speaking, the second feature 304 and the third feature 306 can include some or all of: a pre-determined likelihood of the user clicking the following search result based on one or more search terms contained in the search request, prior user interactions with the following search result, data representative of the features of the following search result and the like.

During the training phase of the second machine learning algorithm 308, the second machine learning algorithm 308 is provided with a set of training objects, for each training object there is provided: respective set of the first feature 302, the second feature 304 and the third feature 306 (as well as potentially a number of additional features associated with the given training object) and a corresponding "target". Within the embodiments of the present technology, the target can be an actual past click-through data of the given training object (such as "1" for click and "0" for no click). Within the embodiments of the present technology, the given training object can be a prior web search result, the first feature 302 can be a position of the prior web search result within a given prior SERP, the second feature 304 and the third feature 306 can be retrieved from the database 130.

The number of the training objects used for training the second machine learning algorithm 308 is not particularly limited and can be selected by those of ordinary skill in the art, having access to the teachings of instant technology. Based on the training objects, the second machine learning algorithm 308 generates a machine learning algorithm formula for predicting the predicted second parameter 310 for a new following search result (i.e. a new web search result) for a given new position within a new SERP, the given new position following a given vertical search result.

With reference to FIG. 4 there is depicted a schematic representation of operation of the third module 124. The third module 124 is configured to execute a third machine learning algorithm 406. The third machine learning algorithm 406 is configured to predict a predicted usefulness parameter 402. In some embodiments of the present technology, the predicted usefulness parameter 402 is indicative of the likelihood of the user clicking the given search result (i.e. the vertical search result) over an immediately following search result (i.e. an immediately following web search result or an immediately following another vertical search result). The predicted usefulness parameter 402 is calculated for the given search result at a given SERP position. For example, a given "page" of the SERP can have 10 positions displayable therein—as such the given search result will have a different predicted usefulness parameter 402 for each of the 10 positions of the given page of the SERP with one of SERP positions having a maximum predicted usefulness parameter 402 amongst the 10 positions of the given page of the SERP. The SERP position with the highest predicted usefulness parameter 402 can be used for placing the given search result (thus, increasing its potential to be clicked by the user).

More specifically the third machine learning algorithm 406 is configured to predict the predicted usefulness parameter 402 based on the predicted first parameter 210 and the predicted second parameter 310. It is noted that the predicted usefulness parameter 402 is calculated for the given search result (i.e. the one associated with the predicted first parameter 210) based on the predicted first parameter and the predicted second parameter 310 (i.e. the parameter associated with the following search result relative to the given search result). It is noted that within these embodiments, the predicted first parameter 210 and the predicted second parameter 310 have been independently predicted in a sense that the predicted first parameter 210 was predicted by the first machine learning algorithm 208 and the predicted second parameter 310 was predicted by the second machine learning algorithm 308.

Even though in the depicted embodiment of FIG. 4, the third machine learning algorithm 406 is configured to use the predicted first parameter 210 and the predicted second parameter 310, it should be noted that in alternative embodiments of the present technology, the third machine learning algorithm 406 can be configured to consider a number of additional parameters.

During the training phase of the third machine learning algorithm 406, the third machine learning algorithm 406 is provided with a set of training objects, for each training object there is provided: a respective set of the predicted first parameter 210 and the predicted second parameter 310 and a corresponding "target". Within the embodiments of the present technology, the target can be a "vertical preference parameter" based on an actual past click-through data of the given training object or other training objects that were presented adjacent to the given training object on past searches. Just as an example and not a specific limitation, the vertical preference parameter can be assigned as follows: (i) the "vertical preference parameter" can be "1" if there was a click on the vertical search result; (ii) the "vertical preference parameter" can be "0" if there was not click on either the vertical search result or on the following search result;

and (iii) the "vertical preference parameter" can be "−2.5" if there was no click on the vertical search result but there was a click on the following search result. It should note that the value "−2.5" can vary in other embodiments of the present technology. The value "−2.5" can be fixed or can vary and be selected based on the SERP position of the vertical search result. The "vertical preference parameter" presented in (iii) is useful to "discount" the value of the vertical search result in those training objects, where the user clicked the following search result based on the assumption that the user had seen the vertical search result but clicked the following result, in a sense, suggesting a lower value associated with the vertical search result (i.e. the user was not interested in the vertical search result).

The number of the training objects used for training the third machine learning algorithm 406 is not particularly limited and can be selected by those of ordinary skill in the art, having access to the teachings of instant technology. Based on the training objects, the third machine learning algorithm 406 generates a machine learning algorithm formula for predicting the predicted usefulness parameter 402 for a new first search result (i.e. a new vertical search result) for a given new position within a new SERP.

Figure 7:
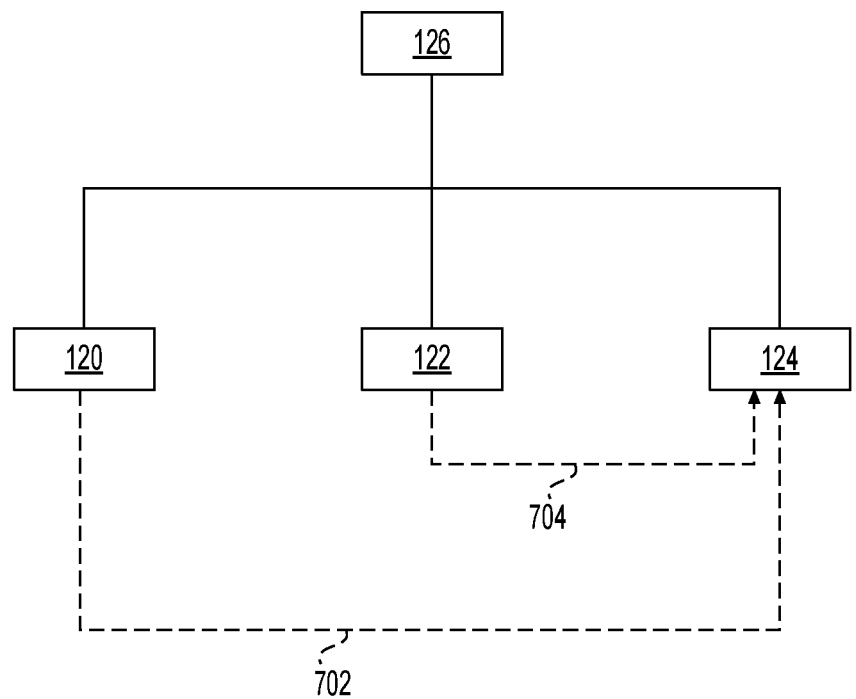
FIG. 7 is a schematic illustration of a training module of FIG. 1, the training module being responsible for training machine learning algorithms of the first module, the second module and the third module.

With reference to FIG. 7 there is depicted a schematic illustration of the training module 126. In some embodiments of the present technology, the training module 126 can be responsible for coordination of training of respective machine learning algorithms of the first module 120, the second module 122 and the third module 124. It should be understood that the functionality of the training module 126 can be incorporated into functionality of one of the first module 120, the second module 122 and the third module 124. Alternatively, the functionality of the training module 126 can be distributed between one or more of the first module 120, the second module 122 and the third module 124.

In some embodiments of the present technology, the training module 126 causes the first module 120 and the second module 122 to be trained independently therebetween. In some embodiments of the present technology, the training module 126 causes the first module 120 and the second module 122 to be trained independently by virtue of using different training objects and different targets. In some other embodiments of the present technology, the training module 126 causes the first module 120 and the second module 122 to be trained independently by virtue of using at least partially overlapping training objects and different targets. In yet some other embodiments of the present technology, the training module 126 causes the first module 120 and the second module 122 to be trained independently by virtue of executing training at different times. In further embodiments of the present technology, the training module 126 causes the first module 120 and the second module 122 to be trained independently by virtue of executing training at at-least-partially-overlapping times.

In accordance with the embodiments of the present technology, the training module 126 causes the third module 124 to be training based on the first feed-forward data 702 from the first module 120 and the second feed-forward data 704 from the second module 122. First feed-forward data 702 is representative of the predicted first parameter 210 and the second feed-forward data 704 is representative of the predicted second parameter 310.

FIG. 5 depicts a schematic representation of operation of the search module 118. In accordance with embodiments of the present technology, the search module 118 is configured to execute a ranking routine 502. Operation of the ranking routine 502 will now be described with additional reference to FIG. 6.

Figure 6:
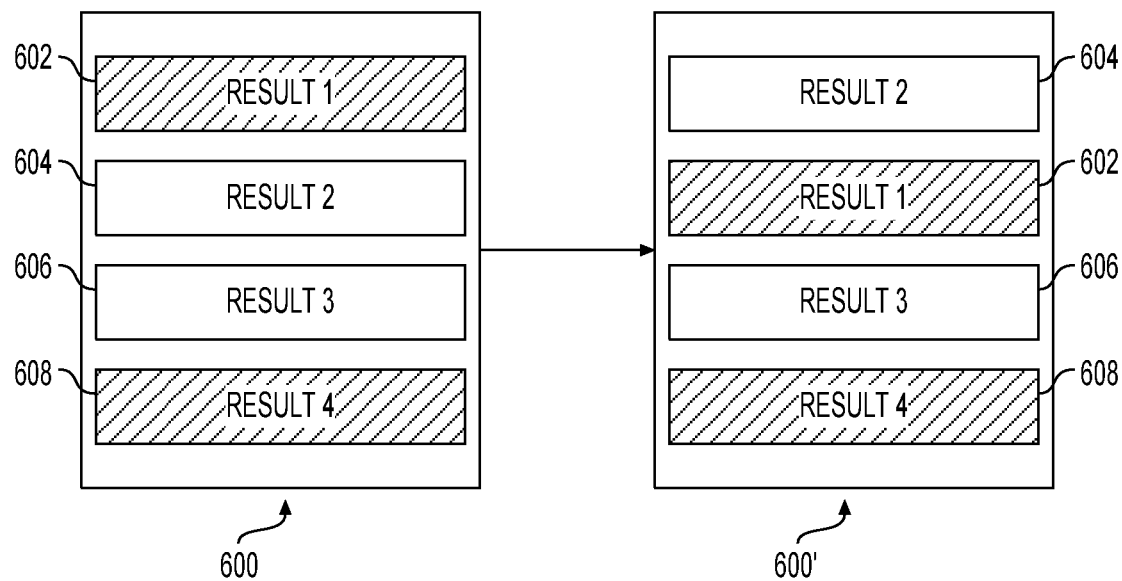
FIG. 6 is a schematic illustration of a ranked search result list and a re-arranged search result list, the re-arranged search result list being an output of the search module of FIG. 5.

FIG. 6 depicts a schematic illustration of a ranked search result list 600 and a re-arranged search result list 600', the re-arranged search result list 600' being an output of the ranking routine 502 executed in accordance with embodiments of the present technology. The ranked search result list 600 includes a first search result 602, a second search result 604, a third search result 606 and a fourth search result 608. Naturally, it should be understood that the first search result 602, the second search result 604, the third search result 606 and the fourth search result 608 are just a few examples of the search results potentially present within the ranked search result list 600. Also, it should be noted that the first search result 602, the second search result 604, the third search result 606 and the fourth search result 608 are just a few examples of the search results potentially present within the ranked search result list 600 have been generated by the search module 118 in response to a user search query received from the electronic device 102.

Some of the first search result 602, the second search result 604, the third search result 606 and the fourth search result 608 are web search results and some of the first search result 602, the second search result 604, the third search result 606 and the fourth search result 608 are just a few examples of the search results potentially present within the ranked search result list 600 are vertical search results. Within the illustrated embodiment, the first search result 602 and the third search result 606 are the vertical search results (and, thus, they are depicted as hashed for ease of illustration) and the second search result 604 and the fourth search result 608 are web search results.

In some embodiments of the present technology, the ranked search result list 600 is ranked, by a preliminary ranking algorithm of the ranking routine 502. In some embodiments, the preliminary ranking algorithm of the ranking routine 502 ranks the web search results (i.e. the second search result 604 and the fourth search result 608). In other embodiments, the preliminary ranking algorithm of the ranking routine 502 ranks the web search results (i.e. the second search result 604 and the fourth search result 608), as well as the vertical search results (i.e. first search result 602 and the third search result 606).

In accordance with embodiments of the present technology, the ranking routine 502 is further configured to execute a vertical result placement selection algorithm. In accordance with embodiments of the present technology, the ranking routine 502 is configured, for each potential SERP placement, to determine the predicted usefulness parameter 402 of any given vertical search result (i.e. first search result 602 and the third search result 606). More specifically, the ranking routine 502 is configured to determine, for the given vertical search result for a given SERP position of the potential SERP positions, the predicted usefulness parameter 402 by (i) causing the first module 120 to determine the predicted first parameter 210 for the given vertical result for the given SERP position; (ii) causing the second module 122 to determine the predicted second parameter 310 for the following search result, i.e. the search result at a position following the given SERP position; (iii) causing the third module to predict the predicted usefulness parameter 402 for the given vertical result for the given SERP position based on the predicted first parameter 210 and the predicted second parameter 310. The ranking routine 502 is further configured to repeat the process for the given vertical search result in relation to other potential given SERP positions. For each of the iterations, the ranking routine 502 determines a respective predicted usefulness parameter 402. The ranking routine 502 can then select the given SERP position with the maximum value of the predicted usefulness parameter 402 for placing the given vertical search result.

In those embodiments, where the preliminary ranking algorithm of the ranking routine 502 ranks the web search results (i.e. the second search result 604 and the fourth search result 608), the loss parameter (i.e. the predicted second parameter 310) is calculated based on the following result being the web search result. In those embodiments, where the preliminary ranking algorithm of the ranking routine 502 ranks the web search results (i.e. the second search result 604 and the fourth search result 608), as well as the vertical search results (i.e. first search result 602 and the third search result 606), the loss parameter (i.e. the predicted second parameter 310) can be calculated based on the following result being either the web search result or another vertical search result, as the case may be.

The above will be illustrated using the first search result 602 of FIG. 6. For the purposes of illustration—we shall assume that there are only three results in the ranked search result list 600: the first search result 602, the second search result 604 and the third search result 606 and the fourth search result 608.

The ranking routine 502 first "places" the first search result 602 is on a top SERP position (as is depicted with the ranked search result list 600.

The ranking routine then determines the predicted usefulness parameter 402 for the first search result 602 places at the top SERP position. More specifically, the ranking routine 502 is configured to determine the predicted usefulness parameter 402 by (i) causing the first module 120 to determine the predicted first parameter 210 for the first search result for the top SERP position; (ii) causing the second module 122 to determine the predicted second parameter 310 for the following search result, i.e. the second search result; (iii) causing the third module to predict the predicted usefulness parameter 402 for the first vertical result 601 for the top SERP position on the predicted first parameter 210 and the predicted second parameter 310. By doing so, the ranking routine 502 has determined a first instance of the predicted usefulness parameter 402 for the first search result 602 for the top SERP position depicted within the ranked search result list 600.

The ranking routine 502 is further configured to repeat the process for the first search result 602 for other SERP positions. With reference to the re-arranged search result list 600', the ranking routine 502 can now place the first search result 602 onto the second SERP position (where the second search result 604 was previously placed). In the embodiment of the re-arranged search result list 600', the ranking routine 502 places the third search result 606 onto a third position while placing the second search result 604 onto the top SERP position. In alternative embodiments, the ranking routine 502 can "shift" the remainder of the result down, effectively placing the second search result 604 onto the third SERP position. In yet other embodiments, the ranking routine 502 can iterative do both, calculating a respective value of the predicted usefulness parameter 402 for the first search result 602 being placed onto the second SERP position relative to (i) the second search result 604 being placed onto the third SERP position and (ii) the third search result 606 being placed onto the third SERP position.

The ranking routine 502 can repeat the process described above for any given SERP position of the first search result 602. The ranking routine 502 can also repeat the same process for any other vertical search results potentially present within the ranked search result list 600, such as the fourth search result 608.

The ranking routine 502 is further configured, for each vertical search result, to select the placement of the given vertical search result. More specifically, the ranking routine selects placement that maximizes the predicted usefulness parameter 402 of the given vertical search result. For example, within the embodiment depicted in FIG. 6, with reference to the re-arranged search result list 600', it may be determined that for the first search result 602, the second SERP position maximizes the predicted usefulness parameter 402 for the first search result 602.

Where there is more than one vertical search result present within the ranked search result list 600 and where two (or more) given vertical search results have the same SERP position associated with their respective maximum predicted usefulness parameter 402, the ranking routine 502 can select the position for the search result with the highest absolute value of the predicted usefulness parameter 402. Alternatively (or where the values match), the ranking routine 502 can select a pre-defined type of vertical search result (for example, the ranking routine 502 can prioritize images vertical over video vertical, etc).

With continued reference to FIG. 5, the ranking routine 50 is configured to receive (i) search results 504 (for example, the ranked search result list 600) and (ii) the predicted usefulness parameter 402 (or a plurality of the predicted usefulness parameters 402) and to output a SERP 510, where the one or more vertical search results (such as the first search result 602 and the fourth search result 608, as well as other vertical search result potentially present within the ranked search result list 600) are placed in accordance with their respective predicted usefulness parameter 402, as has been described above.

Hence, the SERP 510 can be the to have been re-arranged in accordance with the predicted usefulness parameter 410 that has been determined in accordance with embodiments of the present technology.

It is expected that those of ordinary skill in the art, having the benefit of studying instant disclosure will be able to implement the first machine learnt algorithm, the second machine learnt algorithm and the third machine learnt algorithm described above. However, for the purposes of illustration (and not as a limitation), several examples of machine learnt algorithm generated formula will now be described.

In some embodiments of the present technology, the first module 120 executing the first machine learning algorithm 208 can generate the machine learning algorithm formula represented as follows: $p(f, iw)$, where $f$ is one or more factors (such as those described above with reference to the second feature 204 and the third feature 206 and where iw is the given SERP position or, alternatively, a parameter defining the given SERP position (such as an intent weight), i.e. the first feature 202.

In some embodiments of the present technology, the second module 122 executing the second machine learning algorithm 308 can generate the machine learning algorithm formula represented as follows: $p(f, iw)$, where $f$ is one or more factors (such as those described above with reference to the second feature 304 and the third feature 306 and where iw is the given SERP position or, alternatively, a parameter defining the given SERP position (such as an intent weight) of the following search result, i.e. the first feature 302.

In some embodiments of the present technology, the third module 124 executing the third machine learning algorithm 406 can generate the machine learning algorithm formula represented as follows: S(f, iw)=[win, loss], where win is a predicted value generated by the first module 120 and the loss is a predicted value generated by the second module 122. In additional embodiments of the present technology, the third machine learning algorithm 406, in addition to the so-generated win and loss parameters can consider additional features associated with the given vertical search result and/or the given SERP position.

Figure 8:
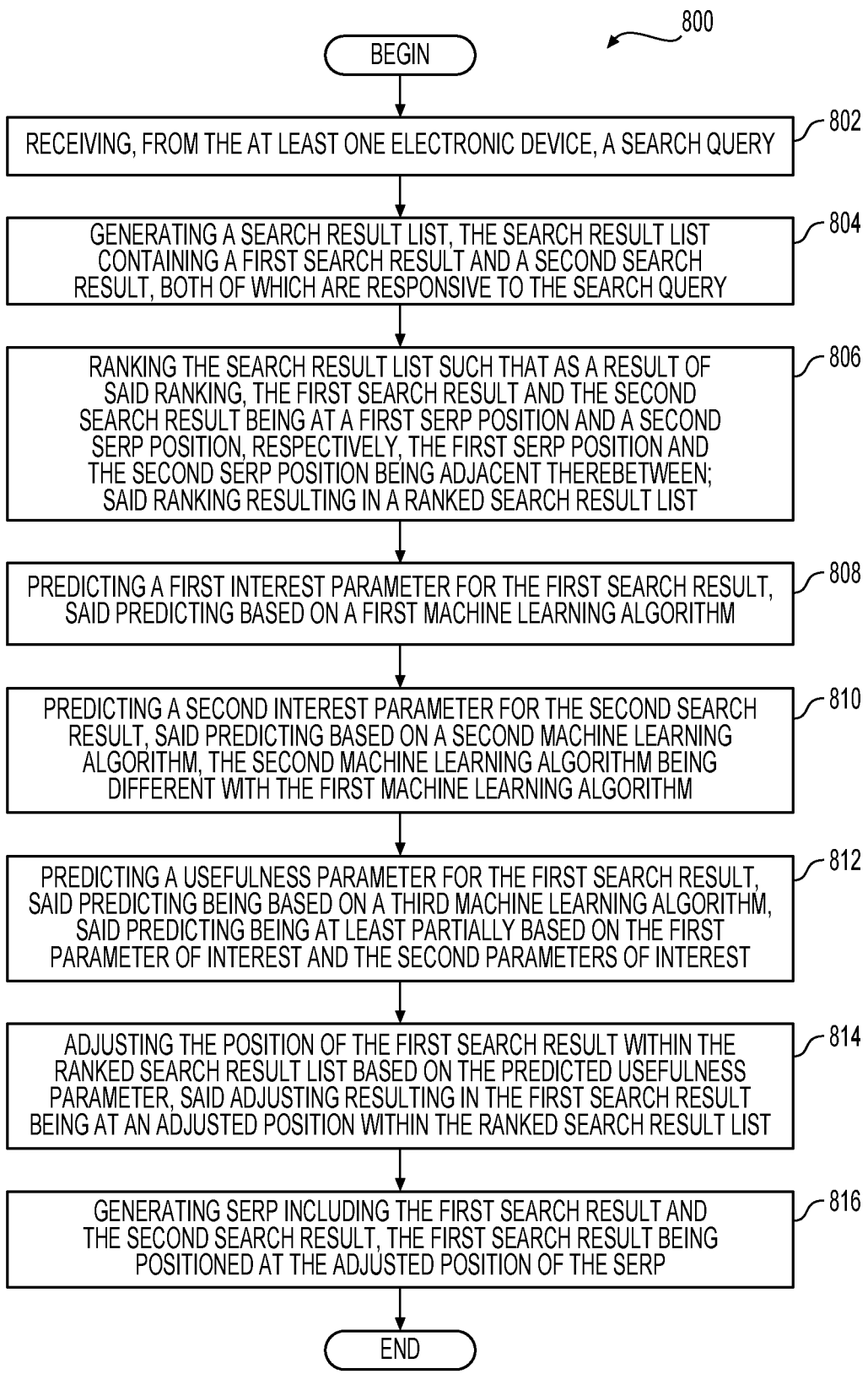
FIG. 8 depicts a block diagram of a method, the method being executable within the system of FIG. 1 and being implemented in accordance with non-limiting embodiments of the present technology.
Figure 10:
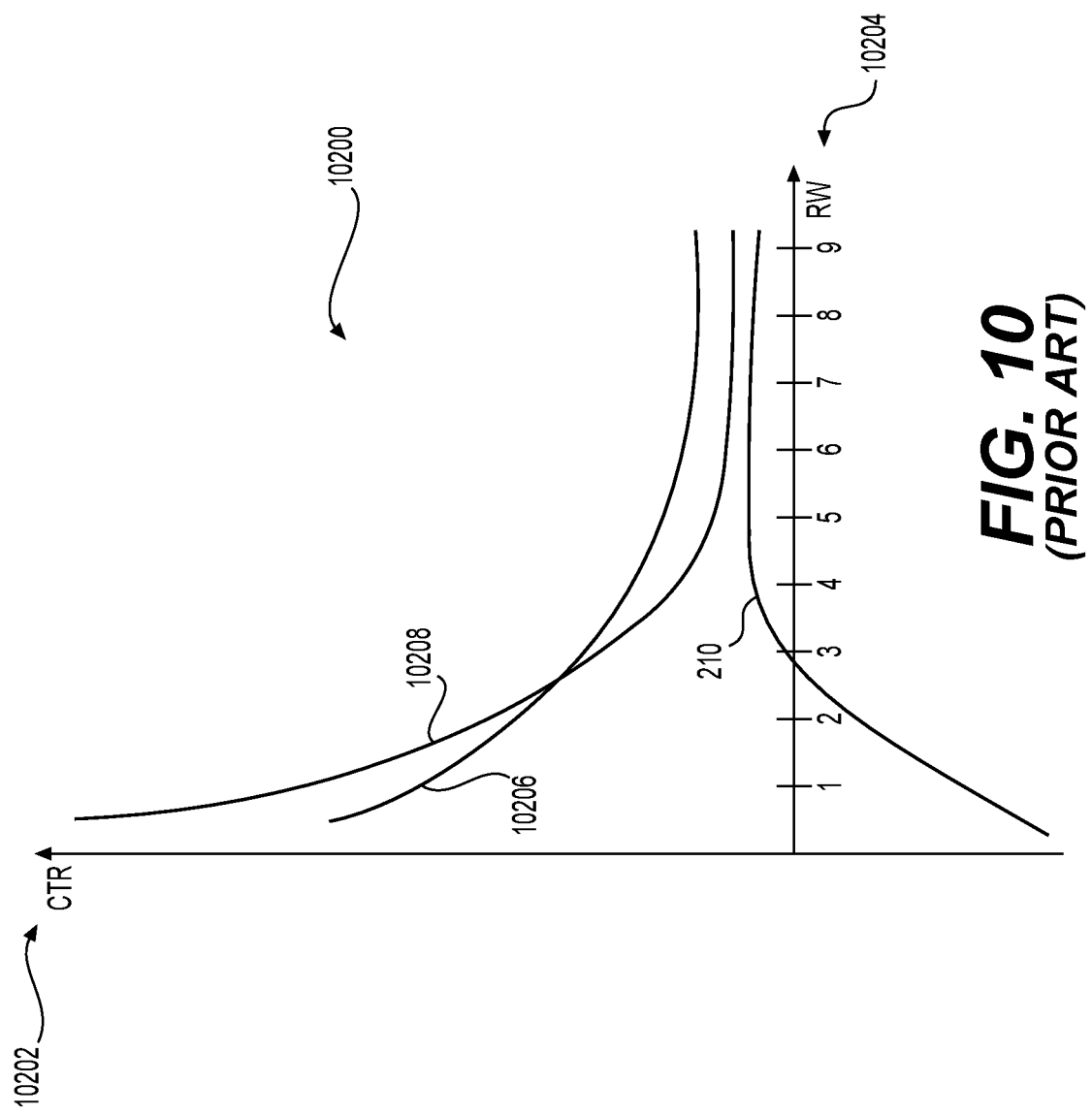
FIG. 10 depicts a graph mapping a particular value of CTR to a particular value of iw as used within prior art approaches for calculating usefulness parameter.

Given the architecture described above it is possible to execute methods for generating a search engine results page (SERP). With reference to FIG. 8, there is depicted a method 800, the method 800 being implemented in accordance with some non-limiting embodiments of the present technology. The method 800 can be executed by the 116.

802—receiving, from the at least one electronic device, a search query

The method 800 starts at step 802, where the server 116 receives, from at least one electronic device (i.e. the electronic device 102) a search query. The search query may have been entered by the user of the electronic device 102 using the search query interface 106.

804—generating a search result list, the search result list containing a first search result and a second search result, both of which are responsive to the search query Next, at step 804, the server 116 generates a search result list, the search result list containing a first search result and a second search result, both of which are responsive to the search query.

The server 116 can cause the search module 118 to generate the search result list using the database 130, as was described in detail above.

806—ranking the search result list such that as a result of the ranking, the first search result and the second search result are at a first SERP position and a second SERP position, respectively, the first SERP position and the second SERP position being adjacent therebetween; the ranking resulting in a ranked search result list At step 806, the server 116 ranks the search result list. As a result of the ranking step the first search result and the second search result are at a first SERP position and a second SERP position, respectively, the first SERP position and the second SERP position being adjacent therebetween. The step of ranking results in a ranked search result list.

It will be recalled that the search module 118 can execute the ranking routine 502. In some embodiments of the present technology, the server 116 causes the search module 118 to execute the preliminary ranking algorithm of the ranking routine 502 to rank the search result list.

In some embodiments, the preliminary ranking algorithm of the ranking routine 502 ranks the web search results. In other embodiments, the preliminary ranking algorithm of the ranking routine 502 ranks the web search results, as well as the vertical search results.

808—predicting a first interest parameter for the first search result, the predicting based on a first machine learning algorithm At step 808, the server 116 predicts a first interest parameter for the first search result. The predicting in step 808 is based on a first machine learning algorithm.

In some embodiments of the present technology, the server 116 causes the first module 120 to generate the predicted first parameter 210.

810—predicting a second interest parameter for the second search result, the predicting based on a second machine learning algorithm, the second machine learning algorithm being different with the first machine learning algorithm At step 810, the server 116 predicts a second interest parameter for the second search result. The step of predicting in step 810 is based on a second machine learning algorithm, the second machine learning algorithm being different with the first machine learning algorithm.

In some embodiments of the present technology, the server 116 causes the second module 122 to generate the predicted second parameter 310.

812—predicting a usefulness parameter for the first search result, the predicting being based on a third machine learning algorithm, the predicting being at least partially based on the first interest parameter and the second interest parameter At step 812, the server 116 predicts a usefulness parameter for the first search result. The step of predicting in step 812 is based on a third machine learning algorithm and being at least partially based on the first interest parameter and the second interest parameter.

In some embodiments of the present technology, the server 116 causes the third module 124 to generate the predicted usefulness parameter 402.

814—adjusting the position of the first search result within the ranked search result list based on the predicted usefulness parameter, the adjusting resulting in the first search result being at an adjusted position within the ranked search result list At step 814, the server 116 adjusts the position of the first search result within the ranked search result list based on the predicted usefulness parameter. The step of adjusting results in the first search result being at an adjusted position within the ranked search result list.

The server 116 can cause the search module 118 to adjust the position of the first search result in accordance with the usefulness parameter.

816—generating the SERP including the first search result and the second search result, the first search result being positioned at the adjusted position of the SERP Next, at step 816, the server 116 generates SERP including the first search result and the second search result, the first search result being positioned at the adjusted position of the SERP.

The server 116 causes the search module 118 to generate the SERP 510. The server 116 can further transmit data associated with the SERP 510 to the electronic device 102, such that to cause the electronic device 102 to display the SERP 510 in the search result interface 108.

The method 800 can then terminate.

In some embodiments of the method 800, the first search result is a vertical search result. In some embodiments of the method 800, the second search result is a web search result. However, it should be understood that in some embodiments of the present technology, the method 800 can be applied to the first search result being either a vertical search result or a web search result. By the same token, it should be understood that in some embodiments of the present technology, the method 800 can be applied to the second search result being either a vertical search result or a web search result.

In some embodiments of the method 800, the first machine learning algorithm and the second machine learning algorithm have been trained independently therebetween.

In some embodiments of the method 800, the third machine learning algorithm has been trained using parameters predicted by the first machine learning algorithm and the second machine learning algorithm.

In some embodiments of the method 800, the parameters predicted by the first machine learning algorithm and the second machine learning algorithm include a first factor indicative of a click-through rate of a given search result and a second factor indicative of a click-through rate of another search result following, in a ranked order, the given search result.

In some embodiments of the method 800, the third machine algorithm is based at least in part on a modified "win-loss" algorithm In some embodiments of the method 800, the step of adjusting the position of the first search result further comprises an additional adjusting the position of the second search result in line with the adjusted position of the first search result.

In some embodiments of the method 800, the search result list further comprises a third search result ranked at a third SERP position, the third SERP position being adjacent to the second SERP position, and the method 800 further comprises: predicting a third interest parameter for the first search result for the second SERP position, the predicting based on the first machine learning algorithm; predicting a fourth interest parameter for the third search result, the predicting based on the second machine learning algorithm; and wherein the predicting the usefulness parameter for the first search result, further comprises predicting a second usefulness parameter for the first search result, the predicting being based on the third machine learning algorithm, the predicting being at least partially based on the third interest parameter and the fourth interest parameter; and wherein the adjusting the position of the first search result further comprises selecting one of the first SERP position and the second SERP position for placing the first search result based on comparison of the usefulness parameter and the second usefulness parameter.

In some embodiments of the method 800, the step of predicting usefulness parameter and the step of predicting the second usefulness parameter are executed substantially simultaneously.

In some embodiments of the method 800, each of the first interest parameter and the second interest parameter is a respective predicted click-through rate.

Figure 11:
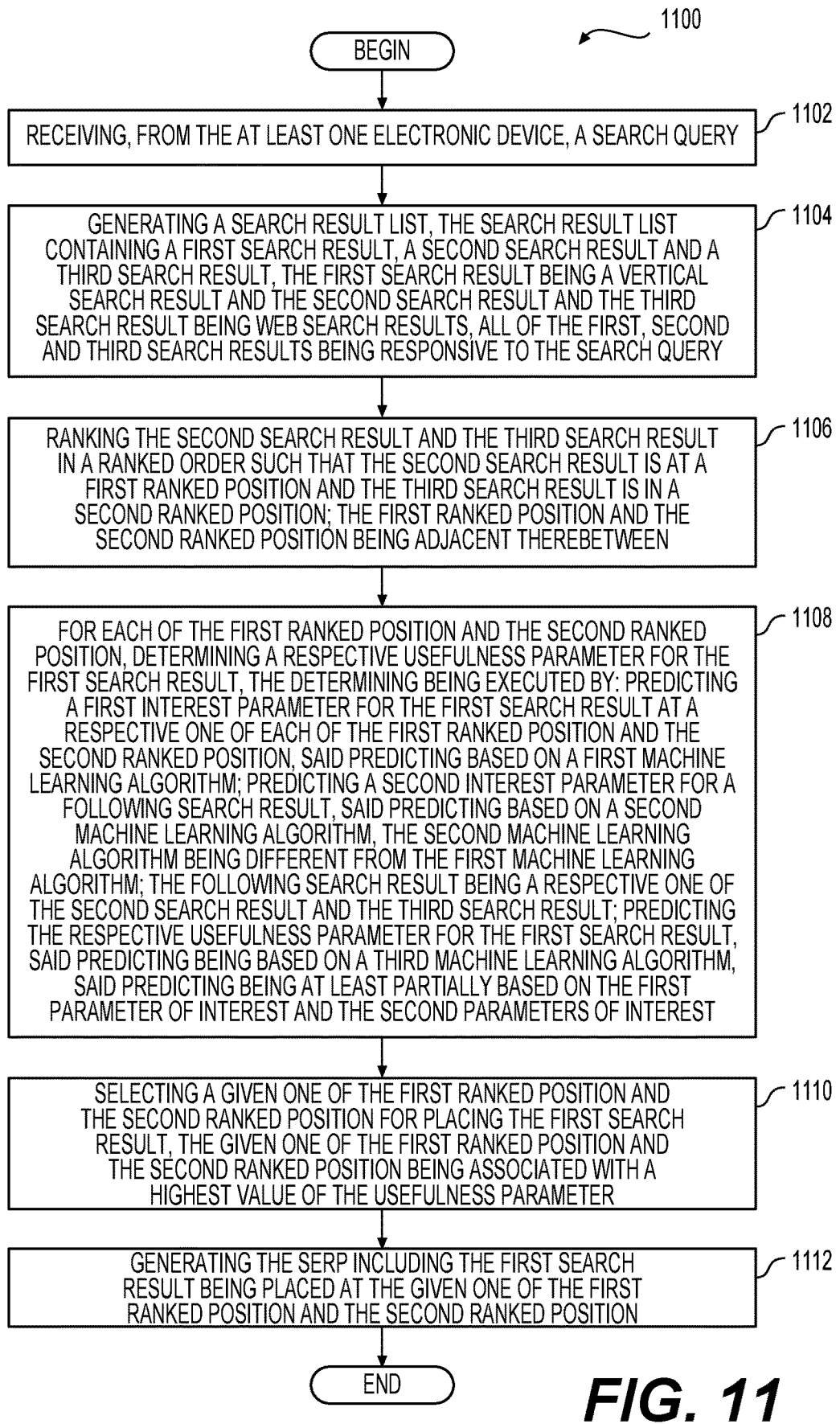
FIG. 11 depicts a flow chart of a method, the method being implemented in accordance with other non-limiting embodiments of the present technology.

With reference to FIG. 11, there is depicted a flow chart of a method 1100, the method 1100 being implemented in accordance with other non-limiting embodiments of the present technology. The method 1100 can also be executed by the server 116.

Step 1102—receiving, from the at least one electronic device, a search query The method 1100 begins at step 1102, where the server 116 receives, from the at least one electronic device (i.e. the electronic device 102, a search query. The search query may have been entered by the user of the electronic device 102 using the search query interface 106.

Step 1104—generating a search result list, the search result list containing a first search result, a second search result and a third search result, the first search result being a vertical search result and the second search result and the third search result being web search results, all of the first, second and third search results being responsive to the search query Next, at step 1104, the server 116 generates a search result list, the search result list containing a first search result, a second search result and a third search result, the first search result being a vertical search result and the second search result and the third search result being web search results, all of the first, second and third search results being responsive to the search query.

Step 1106—ranking the second search result and the third search result in a ranked order such that the second search result is at a first ranked position and the third search result is in a second ranked position; the first ranked position and the second ranked position being adjacent therebetween Next, at step 1106, the server 116 ranks the second search result and the third search result in a ranked order such that the second search result is at a first ranked position and the third search result is in a second ranked position; the first ranked position and the second ranked position being adjacent therebetween.

Step 1108—for each of the first ranked position and the second ranked position, determining a respective usefulness parameter for the first search result, the determining being executed by: predicting a first interest parameter for the first search result at a respective one of each of the first ranked position and the second ranked position, the predicting based on a first machine learning algorithm; predicting a second interest parameter for a following search result, the predicting based on a second machine learning algorithm, the second machine learning algorithm being different from the first machine learning algorithm; the following search result being a respective one of the second search result and the third search result; predicting the respective usefulness parameter for the first search result, the predicting being based on a third machine learning algorithm, the predicting being at least partially based on the first interest parameter and the second interest parameter Next, at step 1108, the server 116 for each of the first ranked position and the second ranked position, determined a respective usefulness parameter for the first search result, the determining being executed by: (i) predicting a first interest parameter for the first search result at a respective one of each of the first ranked position and the second ranked position, the predicting based on a first machine learning algorithm; (ii) predicting a second interest parameter for a following search result, the predicting based on a second machine learning algorithm, the second machine learning algorithm being different from the first machine learning algorithm; the following search result being a respective one of the second search result and the third search result; (iii) predicting the respective usefulness parameter for the first search result, the predicting being based on a third machine learning algorithm, the predicting being at least partially based on the first interest parameter and the second interest parameter.

Step 1110—selecting a given one of the first ranked position and the second ranked position for placing the first search result, the given one of the first ranked position and the second ranked position being associated with a highest value of the usefulness parameter Next, at step 1110, the server 116 selects a given one of the first ranked position and the second ranked position for placing the first search result, the given one of the first ranked position and the second ranked position being associated with a highest value of the usefulness parameter.

Step 1112—generating the SERP including the first search result being placed at the given one of the first ranked position and the second ranked position Next, at step 1112, the server 116 generates the SERP 510 including the first search result being placed at the given one of the first ranked position and the second ranked position.

The server 116 can further transmit data associated with the SERP 510 to the electronic device 102, such that to cause the electronic device 102 to display the SERP 510 in the search result interface 108.

The method 1100 can then terminate.

In some embodiments of the method 1100, the first machine learning algorithm and the second machine learning algorithm have been trained independently therebetween.

In some embodiments of the method 1100, the third machine learning algorithm has been trained using parameters predicted by the first machine learning algorithm and the second machine learning algorithm.

In some embodiments of the method 1100, the parameters predicted by the first machine learning algorithm and the second machine learning algorithm include a first factor indicative of a click-through rate of a given search result and a second factor indicative of a click-through rate of another search result following, in a ranked order, the given search result.

In some embodiments of the method 1100, the third machine algorithm is based at least in part on a modified "win-loss" algorithm.

In some embodiments of the method 1100, the search result list further comprises a fourth search result, the fourth search result being another vertical search result, and wherein the method 1100 further comprises: for each of the first ranked position and the second ranked position, determining a respective second usefulness parameter for the fourth search result, the determining being executed: predicting a first interest parameter for the fourth search result at a respective one of each of the first ranked position and the second ranked position, the predicting based on the first machine learning algorithm; predicting a second interest parameter for a following search result, the predicting based on the second machine learning algorithm, the second machine learning algorithm being different from the first machine learning algorithm; the following search result being a respective one of the second search result and the third search result; predicting the respective second usefulness parameter for the fourth search result, the predicting being based on the third machine learning algorithm, the predicting being at least partially based on the first interest parameter and the second interest parameter; and wherein the selecting the given one of the first ranked position and the second ranked position comprises: selecting the given one of the first ranked position and the second ranked position for placing the first search result, the given one of the first ranked position and the second ranked position being associated with a highest value of the usefulness parameter; selecting the other one of the first ranked position and the second ranked position for placing the fourth search result, the other one of the first ranked position and the second ranked position being associated with a highest value of the second usefulness parameter; and wherein the generating the SERP comprises: placing the first search result at the given one of the first ranked position and the second ranked position;

placing the fourth search result at the other one of the first ranked position and the second ranked position.

Again, it should be understood that the procedure set forth above is simply an illustrative embodiment of the present technology. It is not intended to define or limit the scope of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

Accordingly, embodiments described above can be summarized as follows, presented in numbered clauses.

Clause 1.

A method (800) of generating a search engine results page (SERP), the method executable at a server (116) executing a search engine, the server (116) being accessible via a communication network (110) by at least one electronic device (102), the method (800) comprising:

receiving (802), from the at least one electronic device (102), a search query;

generating (804) a search result list (600), the search result list (600) containing a first search result (602) and a second search result (604), both of which are responsive to the search query, ranking (806) the search result list (600) such that as a result of the ranking, the first search result (602) and the second search result (604) are at a first SERP position and a second SERP position, respectively, the first SERP position and the second SERP position being adjacent therebetween; the ranking (806) resulting in a ranked search result list;

predicting (808) a first interest parameter (210) for the first search result (602), the predicting (808) based on a first machine learning algorithm (208);

predicting (810) a second interest parameter (310) for the second search result (604), the predicting (810) based on a second machine learning algorithm (308), the second machine learning algorithm (308) being different with the first machine learning algorithm (208);

predicting (812) a usefulness parameter (402) for the first search result (602), the predicting (812) being based on a third machine learning algorithm (406), the predicting (812) being at least partially based on the first interest parameter (210) and the second interest parameter (310);

adjusting (814) the position of the first search result (602) within the ranked search result list (600) based on the predicted usefulness parameter (402), the adjusting (814) resulting in the first search result (602) being at an adjusted position within the ranked search result list (600);

generating (816) the SERP (510) including the first search result (602) and the second search result (604), the first search result (602) being positioned at the adjusted position of the SERP.

Clause 2.

The method (800) of clause 1, wherein the first search result (602) is a vertical search result.

Clause 3.

The method (800) of any one of clause 1 or 2, wherein the second search result (604) is a web search result.

Clause 4.

The method of any one of clauses 1 to 3, wherein the first machine learning algorithm and the second machine learning algorithm have been trained independently therebetween.

Clause 5.

The method (800) of any one of clauses 1 to 4, wherein the third machine learning algorithm (406) has been trained using parameters predicted by the first machine learning algorithm (208) and the second machine learning algorithm (308).

Clause 6.

The method (800) of clause 5, wherein parameters predicted by the first machine learning algorithm (208) and the second machine learning algorithm (308) include a first factor indicative of a click-through rate of a given search result and a second factor indicative of a click-through rate of another search result following, in a ranked order, the given search result.

Clause 7.

The method (800) of clause 6, wherein the third machine algorithm (406) is based at least in part on a modified "win-loss" algorithm Clause 8.

The method (800) of any one of clauses 1 to 7, wherein the adjusting the position of the first search result (602) further comprises an additional adjusting the position of the second search result (604) in line with the adjusted position of the first search result (602).

Clause 9.

The method (800) of any one of clauses 1 to 8, wherein the search result list (600) further comprises a third search result (606) ranked at a third SERP position, the third SERP position being adjacent to the second SERP position, the method (800) further comprises:

predicting a third interest parameter (210) for the first search result for the second SERP position, the predicting based on the first machine learning algorithm (208);

predicting a fourth interest parameter (310) for the third search result, the predicting based on the second machine learning algorithm (308); and wherein the predicting the usefulness parameter (402) for the first search result (602), further comprises predicting a second usefulness parameter (402) for the first search result (602), the predicting being based on the third machine learning algorithm (406), the predicting being at least partially based on the third interest parameter (210) and the fourth interest parameter (310); and wherein the adjusting the position of the first search result (602) further comprises selecting one of the first SERP position and the second SERP position for placing the first search result (602) based on comparison of the usefulness parameter (402) and the second usefulness parameter (402).

Clause 10.

The method (800) of clause 9, wherein the predicting usefulness parameter (402) and the predicting the second usefulness parameter (402) are executed substantially simultaneously.

Clause 11.

The method (800) of clause 10, wherein each of the first interest parameter (210) and the second interest parameter (310) is a respective predicted click-through rate.

Clause 12.

A method (1100) of generating a search engine results page (SERP), the method executable at a server (116) executing a search engine, the server (116) being accessible via a communication network (110) by at least one electronic device (102), the method (1100) comprising:

receiving (1102), from the at least one electronic device (102), a search query;

generating (1104) a search result list (600), the search result list (600) containing a first search result (602), a second search result (604) and a third search result (606), the first search result (602) being a vertical search result and the second search result (604) and the third search result (606) being web search results, all of the first, second and third search results (602, 604, 606) being responsive to the search query;

ranking (1106) the second search result (604) and the third search result (606) in a ranked order such that the second search result (604) is at a first ranked position and the third search result (606) is in a second ranked position; the first ranked position and the second ranked position being adjacent therebetween;

for each of the first ranked position and the second ranked position, determining (1108) a respective usefulness parameter (402) for the first search result (602), the determining (1108) being executed by:

predicting a first interest parameter (210) for the first search result (602) at a respective one of each of the first ranked position and the second ranked position, the predicting based on a first machine learning algorithm (208);

predicting a second interest parameter (310) for a following search result (604, 606), the predicting based on a second machine learning algorithm (308), the second machine learning algorithm (308) being different from the first machine learning algorithm (208); the following search result being a respective one of the second search result (604) and the third search result (606);

predicting the respective usefulness parameter (402) for the first search result (602), the predicting being based on a third machine learning algorithm (406), the predicting being at least partially based on the first interest parameter (210) and the second interest parameter (310);

selecting (1110) a given one of the first ranked position and the second ranked position for placing the first search result (602), the given one of the first ranked position and the second ranked position being associated with a highest value of the usefulness parameter (402);

generating (1112) the SERP (510) including the first search result (602) being placed at the given one of the first ranked position and the second ranked position.

Clause 13.

The method (1100) of clause 12, wherein the first machine learning algorithm (208) and the second machine learning algorithm (308) have been trained independently therebetween.

Clause 14.

The method (1100) of any one of clauses 12 or 13, wherein the third machine learning algorithm (406) has been trained using parameters predicted by the first machine learning algorithm (208) and the second machine learning algorithm (308).

Clause 15.

The method (1100) of any one of clauses 12 to 14, wherein parameters predicted by the first machine learning algorithm (208) and the second machine learning algorithm (308) include a first factor indicative of a click-through rate of a given search result and a second factor indicative of a click-through rate of another search result following, in a ranked order, the given search result.

Clause 16.

The method (1100) of any one of clauses 12 to 14, wherein the third machine algorithm (406) is based at least in part on a modified "win-loss" algorithm.

Clause 17.

The method (1100) of any one of clauses 12 to 16, wherein the search result list (600) further comprises a fourth search result (608), the fourth search result (608) being another vertical search result, and wherein the method (1100) further comprises:

for each of the first ranked position and the second ranked position, determining a respective second usefulness parameter for the fourth search result, the determining being executed:
predicting a first interest parameter (210) for the fourth search result (608) at a respective one of each of the first ranked position and the second ranked position, the predicting based on the first machine learning algorithm (208);
predicting a second interest parameter (310) for a following search result, the predicting based on the second machine learning algorithm (308), the second machine learning algorithm (308) being different from the first machine learning algorithm (208); the following search result being a respective one of the second search result (604) and the third search result (606);
predicting the respective second usefulness parameter (402) for the fourth search result (608), the predicting being based on the third machine learning algorithm (408), the predicting being at least partially based on the first interest parameter (210) and the second interest parameter (310);
and wherein the selecting the given one of the first ranked position and the second ranked position comprises:
selecting the given one of the first ranked position and the second ranked position for placing the first search result (602), the given one of the first ranked position and the second ranked position being associated with a highest value of the usefulness parameter (402);
selecting the other one of the first ranked position and the second ranked position for placing the fourth search result (608), the other one of the first ranked position and the second ranked position being associated with a highest value of the second usefulness parameter (402);
and wherein the generating the SERP (510) comprises:
placing the first search result (602) at the given one of the first ranked position and the second ranked position;
placing the fourth search result (608) at the other one of the first ranked position and the second ranked position.

Clause 18.

A server (116) comprising:
an information storage medium;
a network interface configured for communication over a communication network (110);
a processor operationally coupled to the information storage medium and the network interface, the processor being configured to execute the method (800, 1100) of any one of clauses 1 to 17.

The invention claimed is:

1. A method of generating a search engine results page (SERP), the method executable at a server executing a search engine, the server being accessible via a communication network by at least one electronic device, the method comprising:
receiving, from the at least one electronic device, a search query;
generating a search result list, the search result list containing a first search result and a second search result, both of which are responsive to the search query;
ranking the search result list such that as a result of the ranking, the first search result and the second search result are at a first SERP position and a second SERP position, respectively, the first SERP position and the second SERP position being adjacent therebetween, the ranking resulting in a ranked search result list;
predicting a first interest parameter for the first search result, the predicting based on a first machine learning algorithm;
the first interest parameter being indicative of a likelihood of a user clicking on the first search result;
the first machine learning algorithm having been trained to predict the likelihood of the user clicking on a given search result positioned on a given position of a given SERP,
the first machine learning algorithm having been trained based on a first training set of data;
predicting a second interest parameter for the first search result, the predicting based on a second machine learning algorithm, the second machine learning algorithm being different from the first machine learning algorithm;
the second interest parameter being indicative of a likelihood of the user clicking not on the first search result and clicking on the second search result instead;
the second machine learning algorithm having been trained to predict a likelihood of the user not clicking on the given search result and clicking on an other search result instead, the other search result being positioned lower than the given search result, and
the second machine learning algorithm having been trained based on a second training set of data different from the first training set of data;
the first machine learning algorithm and the second machine learning algorithm having been trained independently and separately from each other;
predicting a usefulness parameter for the first search result, the predicting being based on a third machine learning algorithm, the third machine learning algorithm being different from the first machine learning algorithm and the second machine learning algorithm, the predicting being at least partially based on the first interest parameter and the second interest parameter;
adjusting the position of the first search result within the ranked search result list based on the predicted usefulness parameter, the adjusting resulting in the first search result being at an adjusted position within the ranked search result list;
generating the SERP including the first search result and the second search result, the first search result being positioned at the adjusted position of the SERP.

2. The method of claim 1, wherein the first search result is a vertical search result.

3. The method of claim 1, wherein the second search result is a web search result.

4. The method of claim 1, wherein the first machine learning algorithm and the second machine learning algorithm have been trained independently therebetween.

5. The method of claim 4, wherein the third machine learning algorithm has been trained using parameters predicted by the first machine learning algorithm and the second machine learning algorithm.

6. The method of claim 5, wherein parameters predicted by the first machine learning algorithm and the second machine learning algorithm include a first factor indicative of a click-through rate of a given search result and a second factor indicative of a click-through rate of another search result following, in a ranked order, the given search result.

7. The method of claim 6, wherein the third machine algorithm is based at least in part on a modified "win-loss" algorithm.

8. The method of claim 1, wherein the adjusting the position of the first search result further comprises an additional adjusting the position of the second search result in line with the adjusted position of the first search result.

9. The method of claim 1, wherein the search result list further comprises a third search result ranked at a third SERP position, the third SERP position being adjacent to the second SERP position, the method further comprises:
- predicting a third interest parameter for the first search result for the second SERP position, the predicting based on the first machine learning algorithm;
  - the third interest parameter being indicative of a likelihood of a user clicking on the first search result;
- predicting a fourth interest parameter for the first search result, the predicting based on the second machine learning algorithm, second machine learning algorithms being different from the first machine learning algorithm;
  - the fourth interest parameter being indicative of a likelihood of the user clicking not on the first search result and clicking on the third search result instead; and wherein
- the predicting the usefulness parameter for the first search result, further comprises predicting a second usefulness parameter for the first search result, the predicting being based on the third machine learning algorithm, the predicting being at least partially based on the third interest parameter and the fourth interest parameter; and wherein
- the adjusting the position of the first search result further comprises selecting one of the first SERP position and the second SERP position for placing the first search result based on comparison of the usefulness parameter and the second usefulness parameter.

10. The method of claim 9, wherein the predicting the first usefulness parameter and the predicting the second usefulness parameter are executed substantially simultaneously.

11. The method of claim 10, wherein each of the first interest parameter and the second interest parameter is a respective predicted click-through rate.

12. The method of claim 1, wherein the first machine learning algorithm and the second machine learning algorithm have been trained independently based on different training sets of data.

13. A method of generating a search engine results page (SERP), the method executable at a server executing a search engine, the server being accessible via a communication network by at least one electronic device, the method comprising:
- receiving, from the at least one electronic device, a search query;
- generating a search result list, the search result list containing a first search result, a second search result and a third search result, the first search result being a vertical search result and the second search result and the third search result being web search results, all of the first, second and third search results being responsive to the search query;
- ranking the second search result and the third search result in a ranked order such that the second search result is at a first ranked position and the third search result is in a second ranked position; the first ranked position and the second ranked position being adjacent therebetween;
- for each of the first ranked position and the second ranked position, determining a respective usefulness parameter for the first search result, the determining being executed by:
  - predicting a first interest parameter for the first search result at a respective one of each of the first ranked position and the second ranked position, the predicting based on a first machine learning algorithm;
    - the first interest parameter being indicative of a likelihood of a user clicking on the first search result;
    - the first machine learning algorithm having been trained to predict the likelihood of the user clicking on a given search result positioned on a given position of a given SERP, the first machine learning algorithm having been trained based on a first training set of data;
  - predicting a second interest parameter for the first search result, the predicting based on a second machine learning algorithm, the second machine learning algorithm being different from the first machine learning algorithm;
    - the second interest parameter being indicative of a likelihood of the user clicking not on the first search result and clicking on a following search result instead; the following search result being a respective one of the second search result and the third search result;
    - the second machine learning algorithm having been trained to predict a likelihood of the user not clicking on the given search result and clicking on an other search result instead, the other search result being positioned lower than the given search result, and
    - the second machine learning algorithm having been trained based on a second training set of data different from the first training set of data;
  - the first machine learning algorithm and the second machine learning algorithm having been trained independently and separately from each other;
  - predicting the respective usefulness parameter for the first search result, the predicting being based on a third machine learning algorithm, the third machine learning algorithm being different from the first machine learning algorithm and the second machine learning algorithm, the predicting being at least partially based on the first interest parameter and the second interest parameter;
- selecting a given one of the first ranked position and the second ranked position for placing the first search result, the given one of the first ranked position and the second ranked position being associated with a highest value of the usefulness parameter;
- generating the SERP including the first search result being placed at the given one of the first ranked position and the second ranked position.

14. The method of claim 13, wherein the first machine learning algorithm and the second machine learning algorithm have been trained independently therebetween.

15. The method of claim 14, wherein the third machine learning algorithm has been trained using parameters predicted by the first machine learning algorithm and the second machine learning algorithm.

16. The method of claim 15, wherein parameters predicted by the first machine learning algorithm and the second machine learning algorithm include a first factor indicative of a click-through rate of a given search result and a second factor indicative of a click-through rate of another search result following, in a ranked order, the given search result.

17. The method of claim 15, wherein the third machine algorithm is based at least in part on a modified "win-loss" algorithm.

18. The method of claim 13, wherein the search result list further comprises a fourth search result, the fourth search result being another vertical search result, and wherein the method further comprises:

for each of the first ranked position and the second ranked position, determining a respective second usefulness parameter for the fourth search result, the determining being executed:
predicting a first interest parameter for the fourth search result at a respective one of each of the first ranked position and the second ranked position, the predicting based on the first machine learning algorithm;
the first interest parameter being indicative of a likelihood of a user clicking on the fourth search result;
predicting a second interest parameter for the fourth search result, the predicting based on the second machine learning algorithm, the second machine learning algorithm being different from the first machine learning algorithm;
the second interest parameter being indicative of a likelihood of the user clicking not on the fourth search result and clicking on a following search result instead; the following search result being a respective one of the second search result and the third search result;
predicting the respective second usefulness parameter for the fourth search result, the predicting being based on the third machine learning algorithm, the predicting being at least partially based on the first interest parameter and the second interest parameter;
and wherein the selecting the given one of the first ranked position and the second ranked position comprises:
selecting the given one of the first ranked position and the second ranked position for placing the first search result, the given one of the first ranked position and the second ranked position being associated with a highest value of the usefulness parameter;
selecting the other one of the first ranked position and the second ranked position for placing the fourth search result, the other one of the first ranked position and the second ranked position being associated with a highest value of the second usefulness parameter;
and wherein the generating the SERP comprises:
placing the first search result at the given one of the first ranked position and the second ranked position;
placing the fourth search result at the other one of the first ranked position and the second ranked position.

19. A server comprising:
an information storage medium;
a network interface configured for communication over a communication network;
a processor operationally coupled to the information storage medium and the network interface, the processor being configured to:
receive, from the at least one electronic device, a search query;
generate a search result list, the search result list containing a first search result and a second search result, both of which are responsive to the search query;
rank the search result list such that as a result of the ranking, the first search result and the second search result are at a first SERP position and a second SERP position, respectively, the first SERP position and the second SERP position being adjacent therebetween, the ranking resulting in a ranked search result list;
predict a first interest parameter for the first search result, the predicting based on a first machine learning algorithm;
the first interest parameter being indicative of a likelihood of a user clicking on the first search result;
the first machine learning algorithm having been trained to predict the likelihood of the user clicking on a given search result positioned on a given position of a given SERP,
the first machine learning algorithm having been trained based on a first training set of data;
predict a second interest parameter for the first search result, the predicting based on a second machine learning algorithm, the second machine learning algorithm being different with the first machine learning algorithm;
the second interest parameter being indicative of a likelihood of the user clicking not on the first search result and clicking on the second search result instead;
the second machine learning algorithm having been trained to predict a likelihood of the user not clicking on the given search result and clicking on an other search result instead, the other search result being positioned lower than the given search result, and
the second machine learning algorithm having been trained based on a second training set of data different from the first training set of data;
the first machine learning algorithm and the second machine learning algorithm having been trained independently and separately from each other;
predict a usefulness parameter for the first search result, the predicting being based on a third machine learning algorithm, the third machine learning algorithm being different from the first machine learning algorithm and the second machine learning algorithm, the predicting being at least partially based on the first interest parameter and the second interest parameter;
adjust the position of the first search result within the ranked search result list based on the predicted usefulness parameter, the adjusting resulting in the first search result being at an adjusted position within the ranked search result list;
generate SERP including the first search result and the second search result, the first search result being positioned at the adjusted position of the SERP.

* * * * *